US011767737B2

(12) United States Patent
Van Oort et al.

(10) Patent No.: US 11,767,737 B2
(45) Date of Patent: Sep. 26, 2023

(54) METHODS FOR INCREASING WELLBORE STRENGTH

(71) Applicant: BOARD OF REGENTS, THE UNIVERSITY OF TEXAS SYSTEM, Austin, TX (US)

(72) Inventors: Eric Van Oort, Bee Cave, TX (US); Besmir B. Hoxha, Houston, TX (US); Ali Karimi Vajargah, Austin, TX (US); Robert O. Williams, III, Austin, TX (US); Hugh Smyth, Austin, TX (US); Silvia Ferrati, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 17/005,583

(22) Filed: Aug. 28, 2020

(65) Prior Publication Data
US 2021/0115760 A1   Apr. 22, 2021

Related U.S. Application Data

(63) Continuation of application No. 16/300,123, filed as application No. PCT/US2017/031885 on May 10, 2017, now Pat. No. 11,008,832.
(Continued)

(51) Int. Cl.
*E21B 43/24* (2006.01)
*C09K 8/92* (2006.01)
(Continued)

(52) U.S. Cl.
CPC ............ *E21B 36/008* (2013.01); *C09K 8/032* (2013.01); *C09K 8/035* (2013.01); *C09K 8/42* (2013.01);
(Continued)

(58) Field of Classification Search
None
See application file for complete search history.

(56) References Cited

U.S. PATENT DOCUMENTS

| 2,803,526 A | 8/1957 | Nowak |
| 6,285,014 B1 | 9/2001 | Beck et al. |

(Continued)

FOREIGN PATENT DOCUMENTS

| WO | 2013155061 | 10/2013 |
| WO | 2014058777 | 4/2014 |

OTHER PUBLICATIONS

Enayatpour, S., van Oort, E., & Patzek, T. (Sep. 30, 2013). FreezeFrac Improves the Productivity of Gas Shales. Society of Petroleum Engineers. doi:10.2118/166482-MS.
(Continued)

*Primary Examiner* — Anuradha Ahuja
(74) *Attorney, Agent, or Firm* — Meunier Carlin & Curfman LLC

(57) ABSTRACT

Disclosed herein are compositions and methods for reducing fluid loss in a well bore, methods for wellbore strengthening and increasing the integrity of the borehole of an oil or gas well. Also disclosed are methods for artificially increasing the temperature of a subsurface formation in the wellbore to increase the apparent wellbore strength. The mechanism for accomplishing this revolves around increasing fracture propagation pressure by actively manipulating thermal wellbore stresses.

20 Claims, 20 Drawing Sheets

Related U.S. Application Data

(60) Provisional application No. 62/334,002, filed on May 10, 2016.

(51) Int. Cl.

| | | |
|---|---|---|
| *E21B 21/00* | (2006.01) | |
| *E21B 36/00* | (2006.01) | |
| *E21B 33/13* | (2006.01) | |
| *C09K 8/50* | (2006.01) | |
| *C09K 8/035* | (2006.01) | |
| *C09K 8/76* | (2006.01) | |
| *C09K 8/03* | (2006.01) | |
| *C09K 8/42* | (2006.01) | |
| *C09K 8/516* | (2006.01) | |
| *E21B 33/138* | (2006.01) | |

(52) U.S. Cl.
CPC ............... *C09K 8/50* (2013.01); *C09K 8/516* (2013.01); *C09K 8/76* (2013.01); *C09K 8/92* (2013.01); *E21B 21/003* (2013.01); *E21B 33/13* (2013.01); *E21B 33/138* (2013.01); *E21B 43/2405* (2013.01)

(56) References Cited

U.S. PATENT DOCUMENTS

| | | | |
|---|---|---|---|
| 6,497,279 B1 | 12/2002 | Williams et al. | |
| 7,121,341 B2 | 10/2006 | Vinegar et al. | |
| 7,946,342 B1 * | 5/2011 | Robertson | E21B 43/24 166/263 |
| 8,273,426 B1 | 9/2012 | Laramay et al. | |
| 2004/0014607 A1 * | 1/2004 | Sinclair | C09K 8/70 507/200 |
| 2006/0081374 A1 | 4/2006 | Bland et al. | |
| 2006/0144591 A1 | 7/2006 | Gonzalez et al. | |
| 2006/0205608 A1 * | 9/2006 | Todd | C09K 8/52 507/269 |
| 2011/0028357 A1 | 2/2011 | Abad et al. | |
| 2012/0048557 A1 | 3/2012 | Hughes et al. | |
| 2012/0285695 A1 * | 11/2012 | Lafferty | C09K 8/03 166/310 |
| 2014/0151045 A1 * | 6/2014 | Galey | E21B 33/13 166/288 |
| 2014/0262529 A1 | 9/2014 | Quintero et al. | |
| 2014/0290951 A1 | 10/2014 | Al-Taq et al. | |
| 2014/0332233 A1 | 11/2014 | Walton et al. | |
| 2015/0000912 A1 | 1/2015 | Choudhary et al. | |
| 2015/0337638 A1 | 11/2015 | Lawrence et al. | |
| 2016/0369083 A1 | 12/2016 | Khatiwada et al. | |
| 2017/0073571 A1 | 3/2017 | Salla et al. | |
| 2017/0130568 A1 | 5/2017 | Al-Nakhli | |
| 2018/0305600 A1 | 10/2018 | Lucas et al. | |

OTHER PUBLICATIONS

Enayatpour, S., Khaledialidusti, R., & Patzek, T. W. (Aug. 18, 2014). Assessment of Thermal Fracturing in Tight Hydrocarbon Formation Using DEM. American Rock Mechanics Association. 2014-7549 ARMA Conference Paper—2014.

Gonzalez, M. E., Bloys, J. B., Lofton, J. E., Pepin, G. P., Schmidt, J. H., Naquin, C. J., Laursen, P. E., et al., (Jan. 1, 2004). Increasing Effective Fratcure Gradients by Managing Wellbore Temperatures. Society of Petroleum Engineers. doi:10.2118/87217-MS.

Grant, L. S., Japar, N. J. B., Reagins, D., Hale, A., Mercado, S., Van Den Haak, A. L. M., . . . Pereira, A. G. F. (Oct. 27, 2014). Proactive Novel Approach and Design Strategies to Zonal Isolation in a Highly Challenging Deep-Water Environment. Society of Petroleum Engineers. doi:10.2118/170977-MS.

Hettema, M. H. H., Bostrøm, B., & Lund, T. (Jan. 1, 2004). Analysis of Lost Circulation During Drilling in Cooled Formations. Society of Petroleum Engineers. doi:10.2118/90442-MS.

Perkins, T. K., & Gonzalez, J. A. (Apr. 1, 1984). Changes in Earth Stresses Around a Wellbore Caused by Radially Symmetrical Pressure and Temperature Gradients. Society of Petroleum Engineers. doi:10.2118/10080-PA.

Traugott, D. A., Sweatman, R. E., & Vincent, R. A. (Mar. 1, 2007). Increasing the Wellbore Pressure Containment in Gulf of Mexico HP/HT Wells. Society of Petroleum Engineers, doi:10.2118/96420-PA.

Van den Haak, A. L. M., Cameron, W. J., Grant, L. S., Japar, N. J. H., & Reagins, D. R. (May 5, 2014). Mars B Development—Well Challenges & Solutions—An Evolution of Traditional Well, Rig and Facility Design. Offshore Technology Conference. doi:10.4043/25437-MS.

Van Oort, E., Gradishar, J., Ugueto, G., Cowan, K.M., Barton, K.K., and Dudley, J.W. 2003. Accessing Deep Reservoirs by Drilling Severely Depleted Formations. Paper SPE/IADC 79861 presented at the SPE/IADC Drilling Conference, Amsterdam, Feb. 19-21. DOI:10.2118/79861-MS.

Van Oort, E., & Vargo, R. F. (Sep. 1, 2008). Improving Formation-Strength Tests and Their Interpretation. Society of Petroleum Engineers. doi:10.2118/105193-PA.

International Search Report and Written Opinion issued for Application No. PCT/US2017/031885, dated Aug. 1, 2017.

International Preliminary Report on Patentability issued for Application No. PCT/US2017/031885, dated Nov. 22, 2018.

\* cited by examiner

METHODS FOR INCREASING WELLBORE STRENGTH

CROSS-REFERENCE TO RELATED APPLICATIONS

This application is a continuation of U.S. application Ser. No. 16/300,123, filed Nov. 9, 2018, which is a United States National Phase Application under 35 U.S.C. § 371 of International Application No. PCT/US2017/031885, filed May 10, 2017, which claims benefit of U.S. Provisional Application No. 62/334,002, filed on May 10, 2016, the entire contents of which are incorporated by reference in their entireties.

FIELD OF THE INVENTION

This invention relates to methods for wellbore strengthening and increasing the integrity of the borehole of an oil or gas well. In particular, the invention relates to methods for artificially increasing the temperature of a subsurface formation in the wellbore to increase the apparent wellbore strength. The mechanism for accomplishing this revolves around increasing fracture propagation pressure by actively manipulating thermal wellbore stresses.

BACKGROUND

Oil and gas well drilling takes place in a variety of different subterranean environments and geological formations. A wellbore may pass through several geological regions having different geo-mechanical properties i.e. formation strengths, pressure gradients, etc. As a result, differing formations drilled in different regions can have differing fracture gradients, and thus differing susceptibility to fracturing. Low fracture gradients are especially problematic for wellbores passing through depleted zones, for instance reservoirs from which substantial amounts of hydrocarbons have been produced. The wellbore strength in such depleted zones is generally lower than in other formations, leading to small differences between the pore pressure and fracture pressure gradient. As a result, wellbore fracturing in depleted zones is a particularly acute problem. In order to have access to the deeper, virgin-pressured hydrocarbon reservoirs, it may be inevitable to drill through depleted zones. Some of the challenges associated with depleted zones include severe mud loss while drilling and poor zonal isolation after cementing of the oil and gas well. As depleted zones are becoming more common with increased production and field maturation, the need to address fracturing due to these challenges is increasing. There is a need for novel methods of strengthening wellbores, especially those present in depleted zones, in order to successfully drill and cement wells.

Circulation losses can occur when the fluid pressure in the wellbore is sufficient to either re-open existing fracture or create new fractures. When a fracture is created or re-opened, wellbore fluids such as drilling fluids, cementing fluids, completion fluids and the like can be lost from the wellbore through these fractures. This "circulation loss" or "lost circulation" phenomenon is a profound problem not only because of the replacement costs of the lost fluids, but also because the loss of fluids leads to drilling rig downtime to remediate the circulation loss problem. This so-called Non-Productive-Time (NPT) can substantially increase the capital cost of the oil and gas well. It has been estimated that NPT can exceed one million dollars a day of additional drilling rig operating cost in some offshore platforms, and that cumulatively, NPT caused by lost circulation accounts for several billion dollars lost annually by oil and gas well operators.

Through thermal conductivity and expansion, the near-wellbore rock stresses, and thereby the fracture gradient, is sensitive to the temperature in the wellbore. According to thermo-elastic theory, variations in near wellbore tangential (hoop) stress due to heating/cooling may be estimated from the following equation:

$$\sigma_{\theta\theta}^{\Delta T} = \alpha_t E \Delta T / (1-v)$$

in which, $\sigma_{\theta\theta}^{\Delta T}$=changes in tangential stress,
$\alpha_t$=thermal expansion coefficient,
E=Young's modulus,
$\Delta T$=variations in temperature,
v=Poisson's ratio.

According to the above formula, when the fluid temperature in the wellbore is higher than the formation temperature, the thermal component of the rock stresses is increased, whereby the value of the fracture gradient is increased. This reduces the likelihood of fracturing the wellbore or propagating existing fractures. It thereby reduces or prevents circulation loss. Various attempts have been made to artificially heat wellbore fluids, but to date, the methods disclosed have been cumbersome, inefficient, costly and/or impractical.

There remains a need for improved methods and compositions which can be used to strengthen wellbores. There is a need for improved methods and compositions, which can increase the temperature of a wellbore fluid, thereby reducing the likelihood of fracture formation or fracture propagation. There is a need for methods and compositions which can inexpensively and readily reduce circulation loss in oil and gas wellbores.

SUMMARY

Disclosed herein are methods for strengthening wellbores and reducing circulation loss in wellbores. In certain embodiments, wellbores are strengthened and circulation loss is reduced by increasing the fracture gradient in a wellbore. In some selected embodiments, the fracture gradient is increased by increasing the temperature in the wellbore. The method can increase the temperature of the wellbore to a value that is higher than the in-situ wellbore temperatures. Strengthening the wellbore facilitates the ability to achieve sufficient cement lift behind the casing strings that cover the open hole, thereby achieving adequate zonal isolation, thus making it possible to drill through the depleted/loss zones and cement them without major circulation loss problems.

In some selected embodiments, the temperature of the fluid in a wellbore is increased by causing an exothermic event to take place in the wellbore fluid. The exothermic event can be an exothermic dissolution, for instance, caused by contacting one or more compounds with the fluids present in the wellbore. Such compounds have a high enthalpy of hydration, meaning that heat will be generated upon dissolution in water. Exemplary compounds can include salts, such as hygroscopic salts. The exothermic event can be an exothermic reaction, for instance, a neutralization of an acid and/or base or a hydrolysis reaction. Exemplary neutralization reactions include the reaction of a strong base with a strong acid, for instance sodium hydroxide and hydrochloric acid. Exemplary hydrolysis reactions include the reaction of metal halides with water to give metal oxides and/or metal hydroxides. In some embodiments, the exothermic event can include a cascade exothermic reaction, such as a hydrolysis reaction followed by a neutralization reaction. The exothermic event can include combinations of exothermic dissolutions and exothermic reactions.

The location of the exothermic event in the wellbore can be controlled using a composition that controls the heat release of the compound(s) that causes the exothermic event. The composition can have a shell that permits the controlled or timed release of the compound(s). The shell can be selected such that the compound(s) is released sometime after the composition is combined with an aqueous fluid. The shell can be selected such that the compound is released when the composition is exposed to a certain pH. The shell can be selected such that the compound is released when the composition is subjected to temperature and/or pressure depending on the location of the target depletion zone.

The details of one or more embodiments are set forth in the descriptions below. Other features, objects, and advantages will be apparent from the description and from the claims.

DETAILED DESCRIPTION

Figure 1:
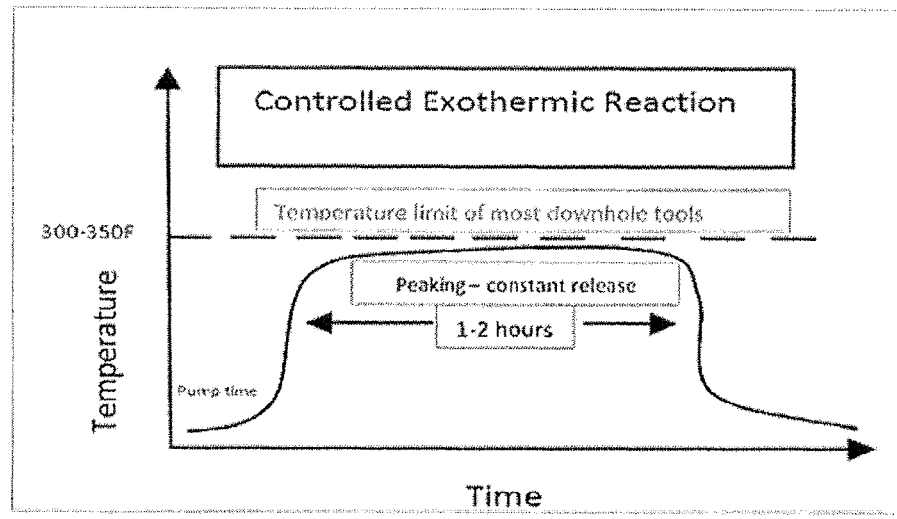
FIG. 1 includes a schematic depiction of one embodiment of the invention.
Figure 2:
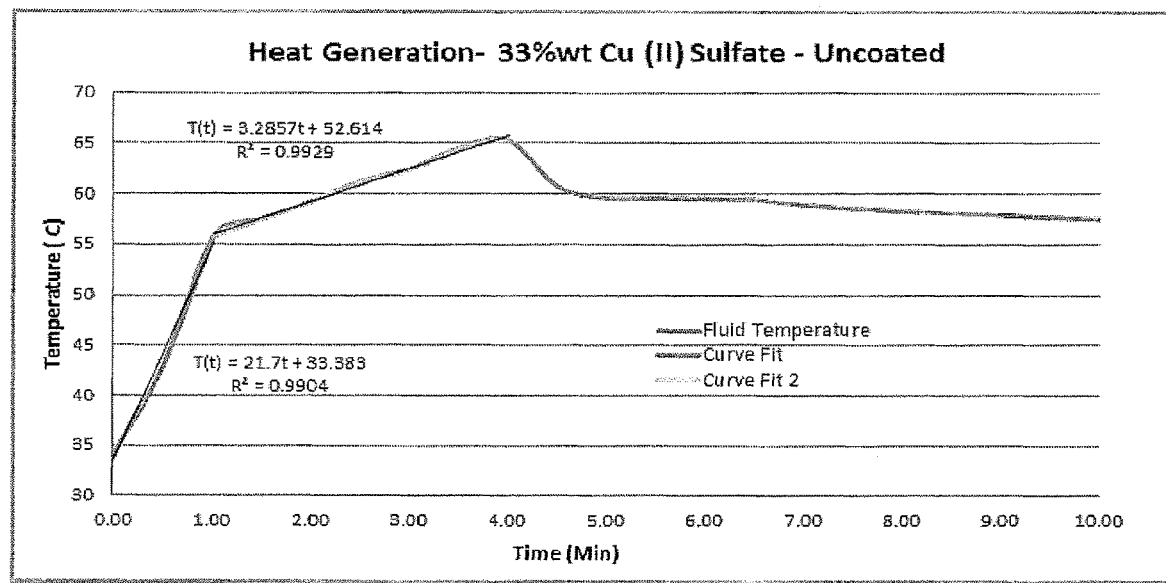
FIG. 2 includes a depiction of a temperature profile experiment with uncoated 33% wt $CuSO_4$ using a calorimeter.
Figure 3:
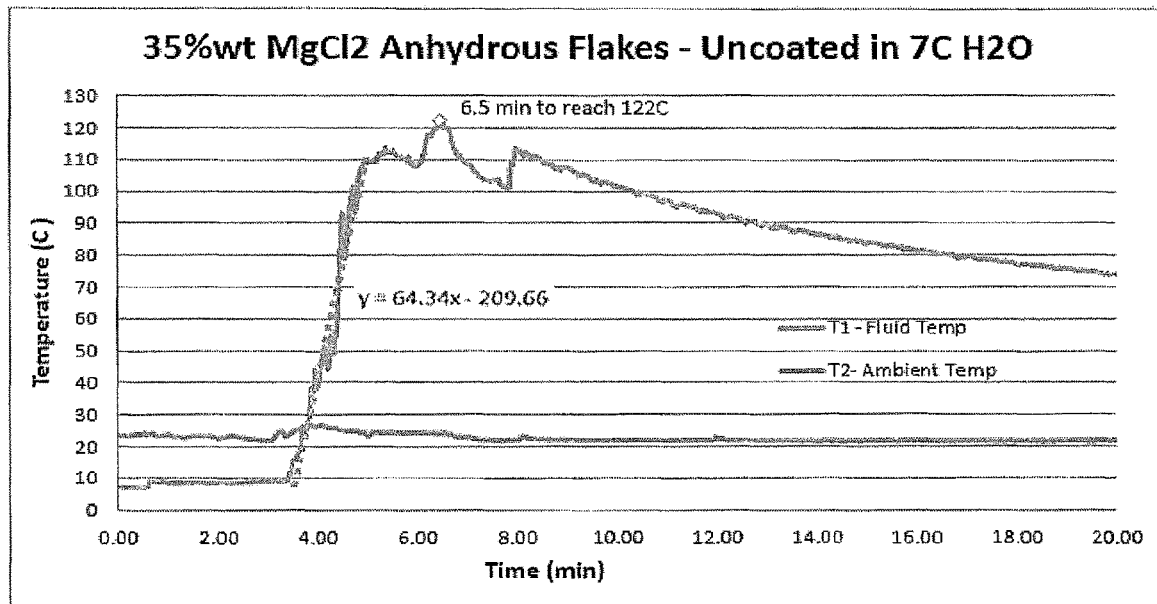
FIG. 3 includes a depiction of a temperature profile using a calorimeter for uncoated 35% wt $MgCl_2$ anhydrous flakes in 7° C. water solution.
Figure 4:
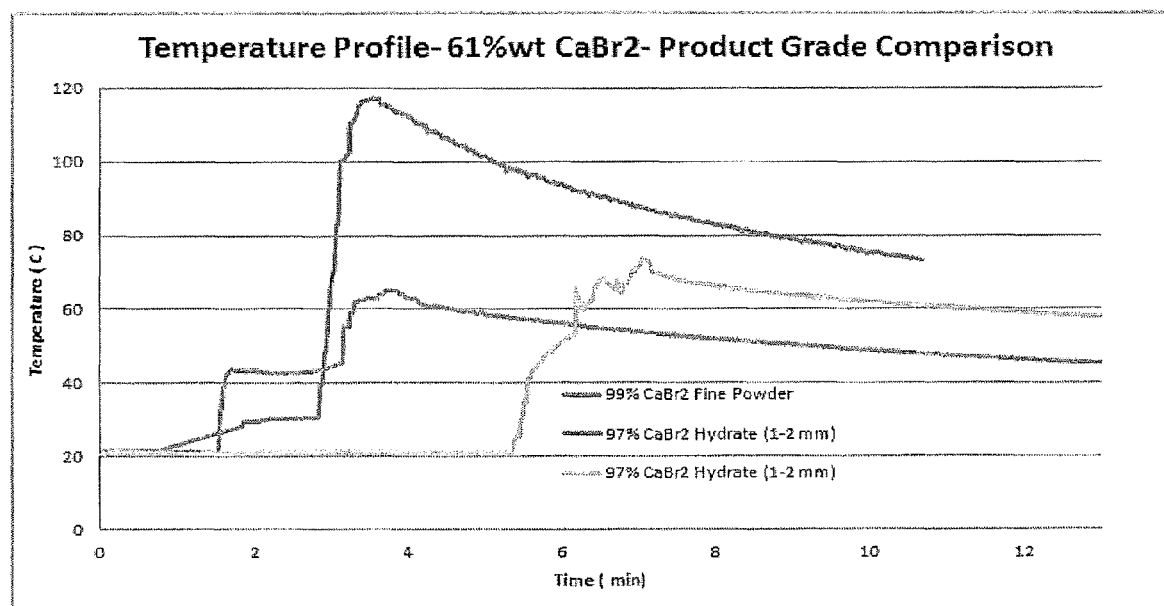
FIG. 4 includes a depiction temperature profile using a calorimeter for 61% wt $CaBr_2$ (fine powder), $CaBr_2$ hydrate (1-2 mm flakes), and $CaBr_2$ hydrate (1-2 mm flakes).
Figure 5:
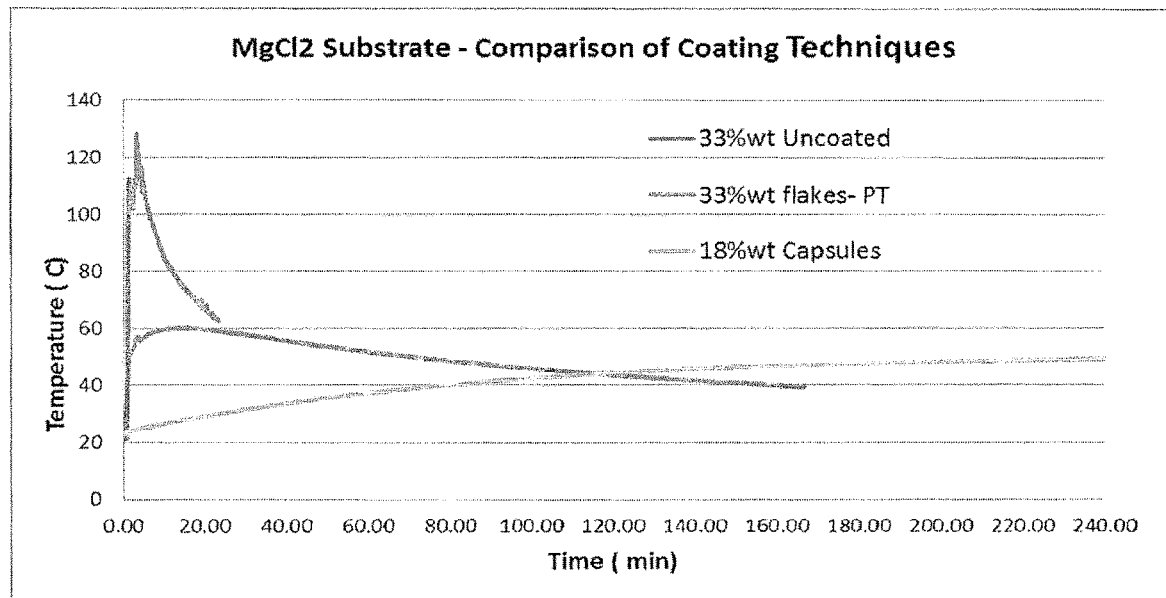
FIG. 5 includes a depiction of temperature profile using a calorimeter for uncoated $MgCl_2$ (33% wt), coated $MgCl_2$ flakes (33% wt, Pan Tumbler coating), and $MgCl_2$ capsules (18% wt—encapsulated, fluid bed coating).
Figure 6:
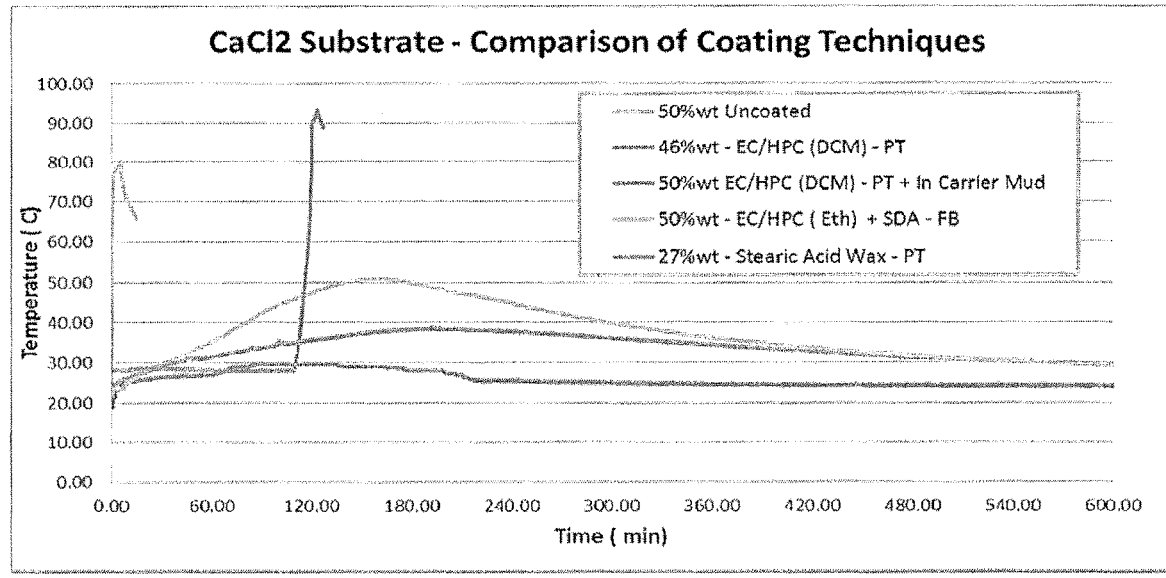
FIG. 6 shows a depiction of temperature profile using a calorimeter for various $CaCl_2$ compositions: 50% wt uncoated, 46% wt with polymeric coating in pan tumbler coating (DCM solvent), 50% wt coated $CaCl_2$ temperature profile in carrier mud, 50% wt coated $CaCl_2$ coated use a fluid bed coating technique (ethanol solvent), and 27% wt Coated $CaCl_2$ with wax coating.
Figure 7:
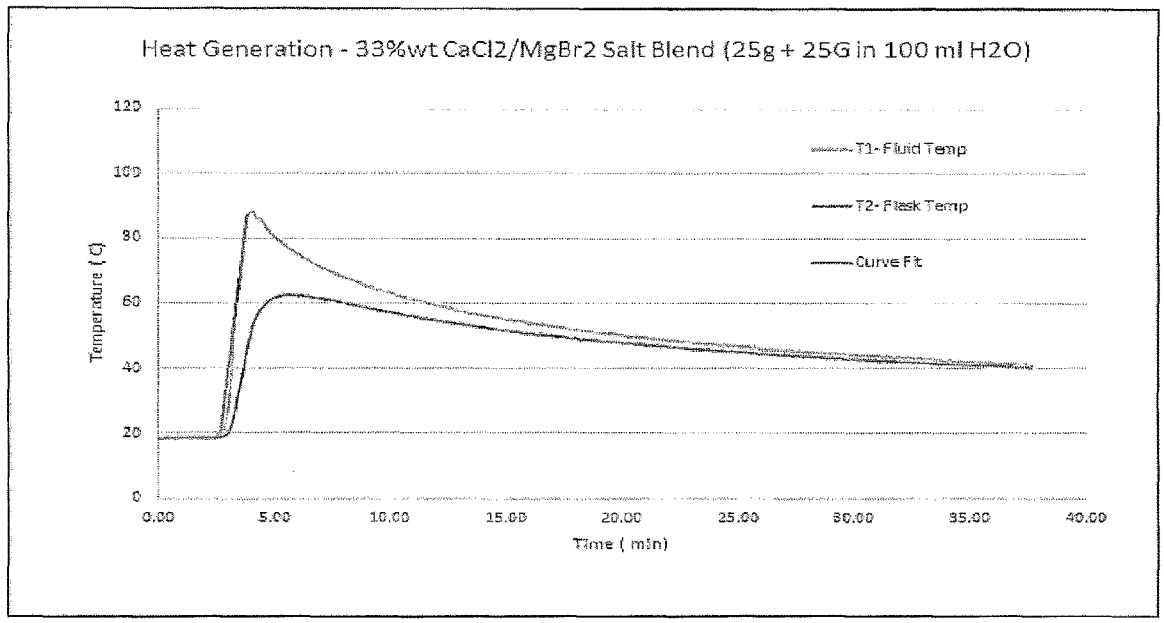
FIG. 7 includes a depiction of temperature profile using a calorimeter for uncoated composition containing a blend of $CaCl_2$ and $MgBr_2$ (50 g total, 1:1) in a 100 ml water solution (33% wt concentration).
Figure 8:
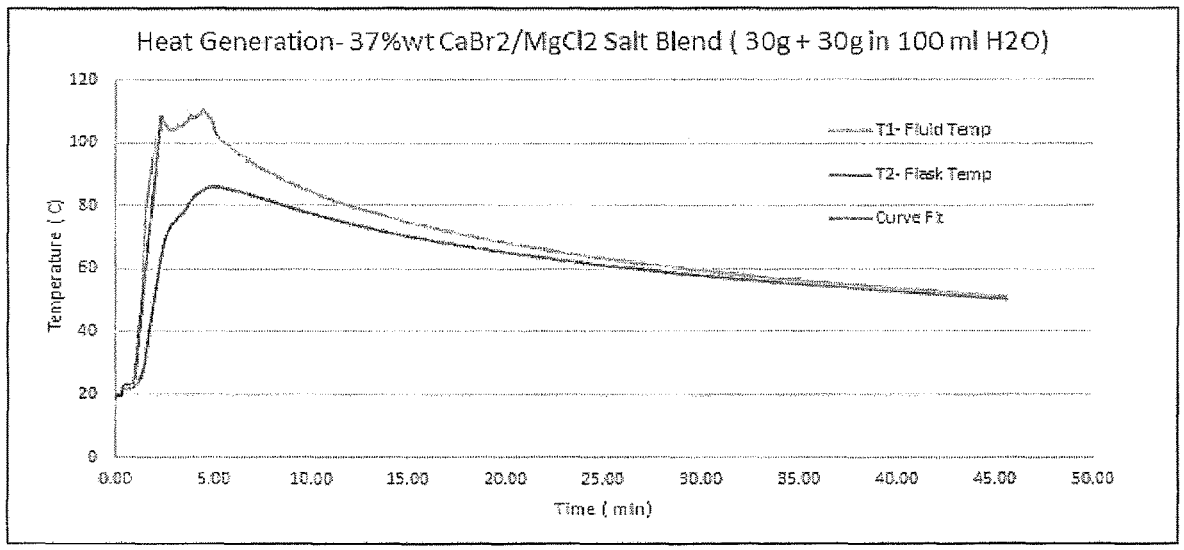
FIG. 8 includes a depiction of temperature profile using a calorimeter for uncoated composition containing a blend of $CaBr_2$ and $MgCl_2$ (60 g total, 1:1) in a 100 ml water solution (37% wt concentration).

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed herein are methods for strengthening wellbores, reducing circulation loss, achieving cement lift and properly completing zonal isolation in wellbores. Wellbores can be strengthened by reducing the rate of fracture re-opening and/or fracture formation. In certain embodiments, wellbore strength is increased by increasing the fracture gradient in a wellbore. The fracture gradient can be increased by at least about 50 PSI, 100 PSI, 200 PSI, 300 PSI, 400 PSI, 500 PSI, 600 PSI, 700 PSI, 800 PSI, 900 PSI or 1000 PSI. The fracture gradient can be increased by at least about 5%, 10%, 15%, 20%, 25%, 30%, 35%, 40%, 45%, 50%, 55%, 60%, 65%, 70%, 75%, 80%, 85%, 90%, 95% or 100% of the pre-existing fracture gradient.

The fracture gradient can be increased at various stages of wellbore operation, including drilling, casing, treating, cementing, work-over, and the like. In certain embodiments, the fracture gradient can be increased in particular zones of the wellbore, for instance in depleted zones such as depleted sand formations.

In some selected embodiments, the fracture gradient is increased by raising the temperature of the wellbore. The temperature can be increased by at least about 5° C., 10° C., 20° C., 30° C., 40° C., 50° C., 75° C., 100° C., 125° C., or 150° C. The temperature can be increased for a period of at least about 5 minutes, 10 minutes, 15 minutes, 20 minutes, 25 minutes, 30 minutes, 45 minutes, 1 hour, 2 hours, 3 hours, 4 hours, 5 hours, or 6 hours. In certain selected embodiments, the temperature can be increased by at least about 5° C.-60° C. for a period of about 5-30 minutes, 10-60 minutes, 20-120 minutes, 30-120 minutes, 45-120 minutes, 60-120 minutes, or 60-90 minutes.

In some embodiments, the method includes increasing the temperature at a location in a wellbore by contacting fluid in the location with a compound that causes an exothermic event at the location. The exothermic event can raise the temperature of the wellbore fluids by at least 5° C., at least 10° C., at least 20° C., at least 30° C., at least 40° C., at least 50° C., at least 75° C., at least 100° C., at least 125° C., or at least 150° C. The temperature can be increased for a period of at least 5 minutes, 10 minutes, 30 minutes, at least 1 hour, at least 2 hours, at least 3 hours, at least 4 hours, at least 5 hours, or at least 6 hours. In certain selected embodiments, the temperature can be increased by at least about 5° C., 10° C., 20° C.-50° C. for a period of about 5-120 minutes, 30-120 minutes, 45-120 minutes, 60-120 minutes, or 60-90 minutes.

Increasing the temperature of wellbore fluids can increase the temperature of the rock formation contacting those fluids. In certain embodiments, the temperature increase penetrates at least about 0.25 cm, 0.5 cm, 0.75 cm, 1.0 cm, 1.25 cm, 1.50 cm, 1.75 cm, 2.0 cm, 2.5 cm, 3.0 cm, 3.5 cm, 4.0 cm, 4.5 cm, or 5.0 cm into the rock formation.

Exothermic Dissolutions

In certain embodiments, the exothermic event includes an exothermic dissolution. An exothermic dissolution can occur when a solute is combined with a solvent, for instance when a solid compound (or mixture) of compounds is contacted with fluids such as those present in a wellbore. Compounds that undergo an exothermic dissolution can have a greater enthalpy of dissolution (in which the compound's enthalpy of hydration is greater than its enthalpy of lattice energy) and can release large amounts of heat/thermal energy.

Exemplary compounds that undergo exothermic dissolutions include salts, such as hygroscopic salts. Some compounds are so hygroscopic that they readily dissolve in the water they absorb: this property is called deliquescence. Exemplary deliquescent compounds include, but are not limited to, zinc chloride, calcium chloride, potassium hydroxide and sodium hydroxide.

Hygroscopic salts include those which absorb/adsorb at least 5%, at least 10%, at least 15%, at least 20%, at least 25%, at least 30%, at least 35%, at least 40%, at least 45%, at least 50%, at least 55%, at least 60%, at least 65%, at least 70% or at least 75% water by weight when stored at 23-25° C. at 60% relative humidity for one week. The absorption/adsorption of water results in a change in the hygroscopic material, for instance an increase in volume, boiling point, viscosity or other physical characteristic and properties of the substance, as water molecules can become suspended between the substance's molecules in the process The compound can include one or more alkaline salt (i.e. Group I cations) or alkaline earth salt (i.e. Group II cations), for instance a calcium salt, a magnesium salt, a potassium salt, and mixtures thereof. In some embodiments, the mixture can be a binary mixture (i.e., two different salts), or a ternary mixture (i.e., three different salts). Higher order mixtures, e.g., quaternary, quinary, senary and the like, may also be used in some embodiments. Exemplary salts include $MgBr_2$, $MgCl_2$, $CaBr_2$, $CaCl_2$, and mixtures thereof, and even possibly the hydrate form of the substrate can be used if so desired.

Exothermic Reactions

In certain embodiments, the exothermic event includes an exothermic reaction. Exothermic reactions can include neutralization reactions and hydrolysis reactions, or a combination thereof. Neutralization reactions include reactions between an acid and a base, for instance between a reactive acid and/or a reactive base. Generally, the reactive acid is a strong acid, i.e., an acid that completely ionizes in water. Exemplary reactive acids include mineral acids such as HCl, HBr, HI, HF, $HNO_3$, $H_2SO_4$, and $H_3PO_4$. Generally, the reactive base is a strong base, i.e., a base that completely ionizes in water. Exemplary reactive bases include alkaline and alkaline earth hydroxides such as NaOH, LiOH, KOH, $Ca(OH)_2$, and $Mg(OH)_2$.

Hydrolysis reactions are those in which a compound reacts with water, wherein at least one oxygen-hydrogen bond in a water molecule is broken. As used herein, the term hydrolysis is distinguished from dissolution in that in a dissolution process water does not undergo formal oxygen-hydrogen bond breaking. Exemplary compounds that will undergo a hydrolysis reaction include metal halides and sulfates such as $ZnCl_2$, $ZnBr_2$, $ZnI_2$, $Zn(SO_4)_2$, $AlCl_3$, $AlBr_3$, $AlI_3$ and $Al(SO_4)_2$, or pyrophosphates such as $K_4P_2O_7$, or phosphorous pentoxide ($P_2O_5$ and/or $P_4O_{10}$). In some embodiments, the compound that undergoes a hydrolysis reaction can be a metal oxide, for instance the metal hydroxide form of NaOH.

In some embodiments, the exothermic reaction can include a cascade reaction. Cascade reactions include those in which two or more compounds are concurrently delivered to the fluid. One of the compounds will undergo a reaction with water, and the product of that first reaction will undergo an additional reaction with another compound. By way of example, a cascade reaction can include a hydrolysis reaction followed by a neutralization reaction. Exemplary cascade reactions include hydrolysis of $ZnCl_2$, to give zinc oxides/hydroxides and HCl, followed by neutralization of the HCl with a strong base such as NaOH.

In some embodiments, the composition can contain one or more hydroxides, e.g., LiOH, NaOH, KOH, $Ca(OH)_2$, or $Sr(OH)_2$; fluorides, e.g., KF, RbF, CsF, $MgF_2$, or $AlF_3$; chlorides, e.g., LiCl, $MgCl_2$, $CaCl_2$, $SrCl_2$, or $AlCl_3$; bromides, e.g., LiBr, NaBr, $MgBr_2$, $CaBr_2$, $SrBr_2$, or $AlBr_3$; iodides, e.g., LiI, NaI, $MgI_2$, $CaI_2$, $SrI_2$, or $AlI_3$; carbonates, e.g., $Li_2CO_3$, $Na_2CO_3$, $K_2CO_3$, $MgCO_3$, $CaCO_3$, or $SrCO_3$; nitrates, e.g., $LiNO_3$, $Mg(NO_3)_2$, or $Ca(NO_3)_2$; sulfates, e.g., $Li_2SO_4$, $Na_2SO_4$, $MgSO_4$, $CaSO_4$, $SrSO_4$, or $Al_2(SO_4)_3$; phosphates or pyrophosphates, e.g., $K_4P_2O_7$, $Na_4P_2O_7$, or $P_2O_5/P_4O_{10}$; or organic salts, for instance acetates, e.g., $NH_4C_2H_3O_2$, or $CH_3COONa$.

Carrier Fluids

Generally, it is preferred that the exothermic event does not take place at the surface of the wellbore, but rather at a location deep in the wellbore. In certain selected embodiments, the compound or mixture of compounds is delivered as a composition which prevents the compound or mixture of compounds from contacting well fluids until the composition has reached the desired location in the wellbore. The composition can be delivered to the location in the wellbore by combining the composition with a carrier fluid. Suitable carrier fluids include water, oil and other non-polar solvents, inverse emulsions, glycerol suspension, glycerol/acetone suspension and mixtures thereof. Oil-based carrier fluids include mineral oil, diesel oil, synthetic oil such as olefins, ester and synthetic paraffins, or combinations thereof. Exemplary solvents include lower alcohols such as methanol, ethanol, isopropanol, isobutyl, n-propanol, ethylene glycol, propylene glycol, or glycerol. The carrier fluid can further contain additional components, for instance surfactants, anti-flocculants, viscosity modifiers, fluid loss additives, weighting agents, buffers, lost circulation material, and buffer components. Thermo-physical properties of certain carrier fluid additives are listed:

| | Density ($g/cm^3$) | Mol. Wt (g/mol) Thermal | Thermal Conductivity (W/mK) | Specific Heat Capacity (J/kgK) | Thermal Expansion ($10^{-6}$/K) | Resistivity $10^{-8}$ ohm/m |
|---|---|---|---|---|---|---|
| Bentonite | 2.35 | 360.31 | 0.4-1.6 | 700-1000 | 220-310 | |
| Sepiolite | 2.0-2.2 | 296.89 | 3.96* | 667* | | |
| Hematite ($Fe_2O_3$) | 4.9-5.3 | 159.69 | 11.28 | 650 | 31 | |
| $Mn_3O_4$ | 4.86 | 228.812 | 2 | 655 | | |
| MgO | 3.54-3.58 | 40.304 | 30-60 | 800-1030 | 9-12 | 1e20-1e21 |
| Barite ($BaSO_4$) | 4.25-4.50 | 233.39 | 1.33 | 460 | | |
| Calcite ($CaCO_3$) | 2.71 | 100.09 | 3.59 | 880 | | |

The carrier fluid can include, but not limited to, the following components:

| General Carrier Fluid | | | |
|---|---|---|---|
| Buffer | $CO_3/HCO_3$ Buffer | 4/1 to 6/1 | ppb |
| Viscosifier | Xanthan | 0.75-1.5 | ppb |
| Viscosifier Substitute | Diutan* | 0.25-1.5 | ppb |
| Fluid Loss Agent | AMPS Polymer* | 2-6 | ppb |
| Weighting Agent | Hematite* | As needed | ppb |
| Weighting Agent | Barite* | As needed | ppb |
| Weighting Agent | $Mn_3O_4$ | As needed | ppb |

*Substitutes depending on environment and carrier mud requirements

The carrier fluid can be delivered to the wellbore by pumping the carrier fluid from the drill pipe to the annular space between the drill pipe and the borehole, or directly to the annulus between the drill pipe and the borehole, or, in case of cementing applications, into the annular space between the casing and the borehole. The carrier fluid can be circulated adjacent a location in the wellbore by pumping it past—or injecting it into—the location. For example, the carrier fluid can be circulated adjacent the location in the formation from the surface and/or downhole by means of a tubing or a drill pipe. Any suitable mechanism for pumping the carrier fluid can be utilized that allows the fluid to go into the formation such as those typically used in hydraulic fracturing. The carrier fluid can be circulated at a fluid density and circulation pressures that are generally low enough to not induce fractures in the formation. The composition can be added to the carrier fluid via a hopper or alternative surface mixing device and then pumped through the drill pipe inside the borehole (conventional circulation), or through the annulus in direct contact with the formation (reverse circulation), or pumped through the casing into the annular space between the casing and the borehole. Heat may be released through thermal convection and/or conduction. Greater control over the location of the exothermic event in the wellbore can be achieved by proper selection of fluid direction. In certain embodiments, the composition can be continuously combined with the carrier fluid and pumped into the wellbore, thereby maintaining the exothermic event for prolonged periods of time in the wellbore. In some embodiments, the composition can be added to the wellbore for a period of at least 0.15 hours, 0.25 hours, 0.5 hours, 0.75 hours, 1.0 hours, 1.25 hours, 1.5 hours, 1.75 hours, 2.0 hours, 2.25 hours, 2.50 hours, 2.75 hours, 3.0 hours, 3.25 hours, and 3.5 hours. 3.75 hours, 4.0 hours, 4.25 hours, 4.5 hours, 4.75 hours, or 5.0 hours.

Compositions

In some embodiments, the composition can have at least two components: (a) a payload which contains at least one compound that causes an exothermic event (i.e., the active material), and (b) a shell which surrounds the payload and prevents it from contacting the wellbore/carrier fluid until the composition has reached the desired location in the wellbore. The compound(s) that causes the exothermic event can be present in the composition in an amount that is at least 5% by weight, 10% by weight, 15% by weight, 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, or at least 80% by weight or the total composition. Generally, the composition (payload and shell), should have a diameter no greater than about 10 mm, no greater than about 9 mm, no greater than about 8 mm, no greater than about 7 mm, no greater than about 6 mm, no greater than about 5 mm, no greater than about 4 mm, no greater than about 3 mm, no greater than about 2 mm, or no greater than about 1 mm. In certain embodiments, the composition has a particle size of the between 1-4 mm. The payload can be present in the composition in an amount that is at least 5% by weight, 10% by weight, 15% by weight, 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 90% by weight.

The payload can contain the compound(s) in a solid form, e.g., powders, granular, pellets, beads, pastilles or flakes, and can be compressed into a tablet.

The payload can contain one or more disintegrating agents, dispersants, swelling agents, plasticizers or combinations thereof. Exemplary agents include cellulosic polymers like ethyl cellulose, microcrystalline cellulose, sodium carboxymethylcellulose and sodium starch glycolate. Other binders include polymers such as polyvinylpyrrolidone and copolymers thereof (e.g., copovidone). Although binders may be present in an amount of from 1-50% by weight, payloads having less binder can be preferred because there is a correspondingly larger amount of active material to cause the exothermic event. For instance, the hinder can be present in an amount from 1-25%, 1-20%, 2-20%, 5-20%, 5-15% or 5-10%. Lubricants can generally be present in an amount from about 0.1-1.0% by weight of the payload.

In certain embodiments, the payload can be provided in tablet form. When the payload includes two or more hygroscopic salts, it is generally preferred to mix the salts together to make a homogenous blend. Tablets may be prepared from powders or flakes using a tablet press to give tablets having a diameter less than about 7.5 mm, 5.0 mm, 4.0 mm, 3.0 mm, 2.0 mm or 1.0 mm Tablets can have a diameter from about 0.25-10 mm, 0.25-7.5 mm, 0.25-5.0 mm, 0.25.0-4.0 mm, 1.5-4.0 mm, 2.0-4.0 mm or 3.0-4.0 mm. The tablet may be prepared using a pressure of at least about 500 PSI, 750 PSI, 1000 PSI, 1250 PSI, 1500 PSI, 1750 PSI, or 2000 PSI, 3000 PSI using a hold time of 1-100 seconds, 1-50 seconds, 5-50 seconds, 10-50 seconds, 25-50 seconds, or 25-35 seconds. The resulting tablets can have a hardness from 1-50 kp, 2.5-40 kp, 5-30 kp, 5-10 kp, 5-15 kp, 10-20 kp, or 20-30 kp. Careful selection of tablet properties and additives permits greater control over the amount of heat releases, as well as the period the heat is released.

The payload, either in powder or tablet form, can be coated with a first external water resistant polymer (or mixture of polymers), providing a plurality of coated particles. The coated particle can then be directly combined with carrier fluid to strengthen wellbores. In some embodiments, the plurality of coated payload particles can then be encapsulated or agglomerated in a second water resistant polymer (or mixture of polymers). When the composition contains two or more different compounds (for instance, for a cascade reaction), the payload may be formulated in a variety of ways. For instance, two or more compounds may be admixed together and then encapsulated in a shell. In other embodiments, compounds may be encapsulated separately in different shells, and then agglomerated together.

In some embodiments, the shell can include water resistant and/or pressure sensitive materials. Water resistant materials include those that erode and/or dissolve over time or as a function of pH when placed in aqueous environments. Pressure sensitive materials can be selected so that the payload is only released at a pressure of no less than about 100 PSI, no less than about 200 PSI, no less than about 300 PSI, no less than about 400 PSI, no less than about 500 PSI, no less than about 600 PSI, no less than about 700 PSI, no less than about 800 PSI, no less than about 900 PSI, or no less than about 1000 PSI.

In certain embodiments, the payload can be provided in particulate form and coated with a shell. In some embodiments, the payload can be encapsulated within a capsule, which can then be further coated with various coating techniques. A plurality of coated payload particles can then be encapsulated or agglomerated in a second shell. The shell can contain multiple layers, for instance either of the same or different polymers. In some embodiments, the shell can include separate layers surrounding each payload, while in other embodiments, the shell can include multiple payloads (each encapsulated within at least one polymer layer) that are agglomerated within a polymer matrix.

When the composition contains more than one compound, the payload may be formulated in a variety of ways. Such compositions include those in which the exothermic event includes a cascade reaction. For instance, two or more compounds may be blended together and then encapsulated in a shell. In other embodiments, compounds may be encapsulated separately in different shells, and then mixed together to give a blend of different compositions. In other cases, the encapsulated payloads may be agglomerated together with a shell or capsule. In certain preferred embodiments, the payload can be coated with a first shell layer. A plurality of coated payload particles can then be encapsulated or agglomerated in a second shell layer.

Wax Coatings

In some embodiments, the shell can include a wax coating. In some embodiments, the wax coating can be used as an inner shell layer, further covered by a different polymer. In some embodiments, the wax coating is the only layer present in the shell. As the wax coating melts, the payload is released into the wellbore. As different waxes have different melting points, selection of the appropriate wax coating permits a temperature controlled release of the payload. In some embodiments, the following waxes can be utilized, either alone or in combination, to achieve the activation/trigger temperature required for a specific target zone in the wellbore (depth and temperature):

| Wax | Melting Point (° C.) |
|---|---|
| Natural - Plant, animal, mineral, petroleum | |
| Stearic Acid | 69-70 |
| Cetostearyl Alcohol | 49-54 |
| Carnauba Wax | 80-86 |
| Cetyl Esters Wax | 43-47 |
| Microcrystalline Wax | 54-102 |
| Cetomacrogol Emulsifying Wax | 50-54 |
| White Beeswax | 61-65 |
| Yellow Beeswax | 61-65 |
| Paraffin wax | 46-68 |
| Candelilla wax | 68.5-72.5 |
| Montan wax | 80 |
| Synthetic | |
| Fischer-Tropsch | 45-106 |
| Alpha olefin waxes | 80-82 |
| Polyethylene wax | 85-140 |

Delayed Release Polymers

The shell materials can be selected so that the payload is not released for at least about 0.10 hours, 0.20 hours, 0.25 hour, 0.30 hours, 0.5 hour, 0.75 hour or for at least about 1 hour, for at least about 1.5 hours, for at least about 2.0 hours, for at least about 2.5 hours, for at least about 3.0 hours, for at least about 3.5 hours, for at least about 4.0 hours, for at least about 4.5 hours, or for at least about 5.0 hours after the composition is placed into contact with the wellbore fluid. In certain preferred embodiments, the payload is released about 1.5 hours after exposure to water, and continuously releases heat for about 1.5 hours thereafter. In some embodiments, the shell can contain a delayed release polymer sufficient that the payload is not released for at least about 0.25 hours, for at least 0.5 hours, for at least about 1 hour, for at least about 1.5 hours, for at least about 2.0 hours, for at least about 2.5 hours, for at least about 3.0 hours, for at least about 3.5 hours, for at least about 4.0 hours, for at least about 4.5 hours, or for at least about 5.0 hours after the composition is placed into contact with the wellbore fluid. The shell can contain an enteric release polymer that does not release the payload until the composition is exposed to a fluid having a pH of greater than about 4.0, greater than about 5.0, greater than about 6.0, greater than about 6.5, greater than about 7.0, greater than about 7.5, greater than about 8.0 or greater than about 8.5, greater than about 9.5, greater than about 10.0, greater than about 10.5, greater than about 11.0, or greater than about 11.5. In some embodiments, the shell can include an inner layer of an enteric release polymer and an outer layer of a delayed release polymer. In other embodiments, the shell can include an inner layer of a delayed release polymer and an outer layer of an enteric release polymer.

Suitable delayed release polymers can include water insoluble polymers, or a mixture of water insoluble and water soluble polymers. Exemplary delayed release polymers include alkylcelluloses such as ethylcellulose, cellulose ethers, for example hydroxyalkylcelluloses such as hydroxypropyl cellulose and hydroxypropylmethylcellulose, carboxyalkylcelluloses such as carboxymethylcellulose, cellulose acetate, and cellulose acetate phthalate, shellac, carnauba wax, and combinations thereof.

In some embodiments, the shell can contain a delayed release layer that is a mixture of an alkyl cellulose with a hydroxyalkyl cellulose. In some embodiments, the alkyl cellulose can be present in an amount of 50-99%, 60-95%, 70-90%, 75-90%, or 80-90% by weight. Exemplary combinations include ethyl cellulose and hydroxypropyl cellulose. By way of example, ethyl cellulose and hydroxypropyl cellulose can be blended in a ratio (w/w) from 50:50 to 99:1, for instance such as 70:30, 75:25, 80:20, 85:15, 90:10 or 95:5. In some cases, the ethyl cellulose and hydroxypropyl cellulose can be blended in a ratio from about 95:5 to 70:30 or from about 90:10 to 80:20.

In some embodiments, the shell can contain one or more layers of a mixture of delayed release polymers, such as mixtures of alkylcelluloses and hydroxyalkyl celluloses, as well as one or more layers of a hydroxyalkyl cellulose that is not blended with an alkylcellulose. For instance, the payload can first be coated with a water swellable polymer, and then that composition can be coated with a blend of a hydrophobic polymer and water swellable polymer. In some embodiments, the composition can include a blend of alkylcellulose and hydroxyalkyl cellulose coating a layer of hydroxyalkyl cellulose. For such compositions the alkyl cellulose can be present in an amount of 50-99%, 60-95%, 70-90%, 75-90%, or 80-90% by weight.

Suitable enteric release polymers include acrylic and methacrylic acid polymers and copolymers, such as methyl methacrylate, methyl methacrylate copolymers, ethoxyethyl methacrylates, cynaoethyl methacrylate, aminoalkyl methacrylate copolymer, poly(acrylic acid), poly(methacrylic acid), methacrylic acid alkylamine copolymer, poly(methyl methacrylate), poly(methacrylic acid) (anhydride), polymethacrylate, polyacrylamide, poly(methacrylic acid anhydride), and glycidyl methacrylate copolymers.

In some embodiments, the shell can be pressure-sensitive, for instance, releasing the payload at a pressure of no less than about 100 PSI, no less than about 200 PSI, no less than about 300 PSI, no less than about 400 PSI, no less than about 500 PSI, no less than about 600 PSI, no less than about 700 PSI, no less than about 800 PSI, no less than about 900 PSI, or no less than about 1000 PSI at The composition is specifically designed that it does not release its payload until it reaches a certain depth in the wellbore, triggered by pressure. The shell can includes a plurality of hollow porous microspheres. The microspheres can include, by way of example, glass, ceramic, metal, plastic, or mixtures thereof. In some embodiments, the shell can include layer of microspheres surrounding the payload and a polymer layer surrounding the layer of microspheres, while in other embodiments, the shell can include multiple payloads (each surrounded by a layer of microspheres) that are agglomerated within a polymer matrix. In any of the above embodiments, the shell can include a layer that is a mixture of microspheres and polymer.

The polymers can be coated onto the payload using various methods such as a pan coat tumbler or a fluid bed. Exemplary solvents include halogenated alkanes such as dichloromethane (DCM) and 1,1 dichloroethane, and alcohols such as anhydrous ethanol and isopropanolA suitable concentration of polymer in solution is from about 0.5-10%, 0.5-7.5%, 1.0-7.5%, 2.5-7.5%, or 5%. The plasticizer may be present in an amount from about 0.1-10%, 0.3-5.0%, or 0.3-3.0%.

Generally, it is preferred to conduct the coating process in a low humidity environment. For instance, the relative humidity in the coating chamber can be less than about 50%, 40%, 30%, 25%, 20%, 17.5%, 15%, 12.5%, 10.0%, 7.5%, 5.0%, or 2.5%. In certain embodiments, the coating can take place in an inert atmosphere such as anhydrous nitrogen or argon gas.

The coated compositions can contain the active ingredient(s) in an amount that is at least about 30%, 40%, 50%, 60%, 70, 75%, 80%, 85%, or 90% by weight of the total composition. In some embodiments, the active ingredient can be present in an amount from about 30-90%, 45-90%, 50-90%, 60-90% or 70-90%.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Calorimeter

Briefly, this device includes a flask having two types of insulation material: thermal fibers and asphalt/tar based insulation with an outer aluminum layer. The insulation layers are approximately two inches thick total. A stir bar is placed inside the flask. A solvent fluid (usually water) is added, followed by a payload or composition. The flask is further wrapped with insulation and covered with Styrofoam and placed on top of a magnetic stirrer. The entire apparatus can be placed into an insulated cooler, where humidity and ambient temperature can be constant and controlled. Various thermocouples are placed within the apparatus, e.g., inside the flask, in the insulation, between the insulation and cooler, and ambient temperature.

Accurate thermodynamic measurements can then be made from the temperature data obtained from the thermocouples.

Example 1

Heat Generation Using Hygroscopic Salts

Hygroscopic salts were added to a genie bottle calorimeter containing 100 ml water. The weight percent below refers to the final concentration of salt after addition was complete. Temperature profiles were tested while stirring and without stirring. The thermal energy release from each salt was determined by using an advanced thermocouple and data acquisition instrument, where multiple thermocouples were used to accurately measure the heat distribution, heat generation, heat release/dissipation and insulation of the calorimeter. Thermal energy:

| Substrate | Form | $Q_{gen}$ (kw/m$^3$) | Heat Generation Duration (s) | Energy Release (kJ/mol) | ΔT (° C.) |
|---|---|---|---|---|---|
| 65% wt K$_4$P$_2$O$_7$ | Pellets | 2675 | 605 | −76 | 35 |
| 50% wt CaCl$_2$ | Granular | 1570 | 150 | −55 | 60 |
| 61% wt CaBr$_2$ | Powder | 3256 | 128 | −133 | 98 |
| 33% wt MgCl$_2$ | Flakes | 3257 | 140 | −128 | 107 |
| 35% wt MgCl$_2$ | Flakes | 4478 | 94 | −131 | 115 |
| 50% wt MgBr$_2$ | Powder | 4340 | 105 | −163 | 106 |
| 33% wt CuSO$_4$ | Powder | 1739 | 240 | −61 | 31 |

Example 2

Payload Compositions

MgCl$_2$ payload powders were prepared having various excipients. Flow characteristics for the different powders were assessed by measuring Carr and Hausner ratios.

| | Composition | Carr's index | Hausner ratio | Evaluation Carr's index (compressibility) | Evaluation Houser ratio |
|---|---|---|---|---|---|
| F1 | EC 10% + 0.3% Mg-Stearate | 21.88 | 1.22 | Passable | Fair |
| F2 | EC 10% | 25.00 | 1.25 | Passable | Fair |
| F3 | Co-povidone 10% + 0.3% Mg-Stearate | 26.03 | 1.26 | Poor | Poor |
| F4 | Co-povidone 10% | 25.71 | 1.26 | Poor/passable | Poor/passable |
| F5 | EC 15% + 0.3% Mg Stearate | 19.44 | 1.19 | Fair | Fair |
| F6 | EC 15% | 16.00 | 1.16 | Fair | Good |
| F7 | 5% copovidone + 5% EC + 0.3% Mg-Stearate | 18.31 | 1.18 | Fair | Good/fair |
| F8 | 5% copovidone + 5% EC | 18.31 | 1.18 | Fair | Good/fair |

Example 3

MgCl$_2$ Payload Tablets

MgCl$_2$ payload compositions were prepared by directly compressed MgCl$_2$ (alone or with excipients) into tablets using a manual press. The hardness of each tablet was evaluated.

| Material | Amount (mg) | Pressure (psi) | Hold Time (s) | Hardness (kp) |
|---|---|---|---|---|
| MgCl$_2$ (powder) | 455.7 | 1000 | 30 | 9 |
| MgCl$_2$ (powder) | 489 | 1000 | 30 | 6.4 |
| MgCl$_2$ (powder) | 493 | 1000 | 30 | 6 |
| MgCl$_2$ (powder) | 496 | 1700 | 30 | 13.2 |
| MgCl$_2$ flakes + 5% explotab | 487 | 1700 | 5 | 7.1 |
| MgCl$_2$ flakes + 5% explotab + 1% Mg-Stearate | 477 | 1700 | 5 | 5.9 |
| MgCl$_2$ flakes + 50% MCC PH 200 (Ceolus) | 477 | 1000 | 5 | 14.5 |
| MgCl$_2$ powder + 5% Aqualon EC N10 | 488.6 | 1700 | 30 | 23.7 |
| MgCl$_2$ powder + 5% Klucel HPC-ELF | 487 | 1700 | 30 | 22.6 |
| MgCl$_2$ powder + 5% Klucel HPC-LXF | 488.1 | 1700 | 30 | 27.7 |
| MgCl$_2$ powder + 5% Explotab | 480 | 1700 | 30 | 21.3 |
| MgCl$_2$ powder + 5% HPMC E15 | 482.4 | 1700 | 30 | 20.1 |

Example 4

Preparation of Coated Compositions

Figure 9:
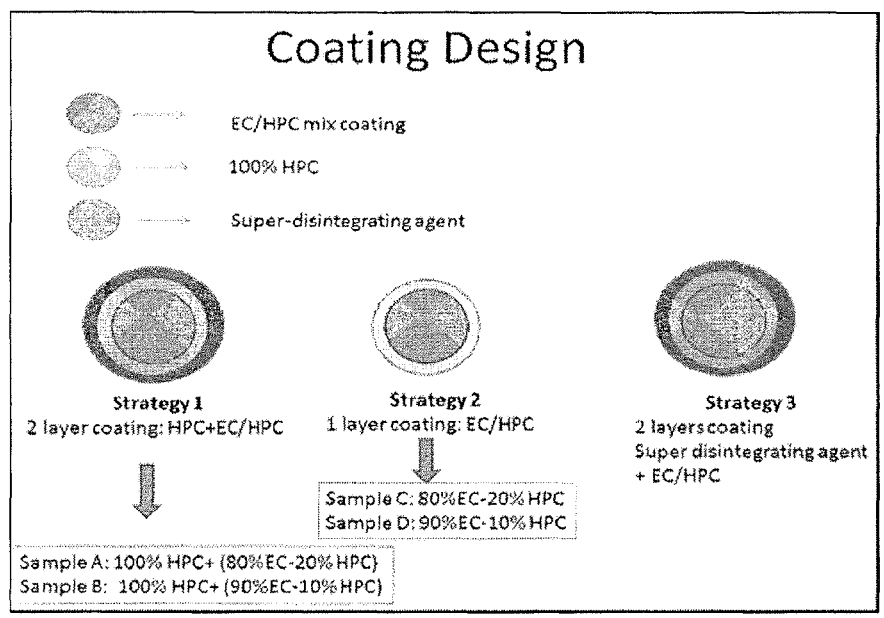
FIG. 9 includes visual depictions of several different polymer-coating strategies of shell embodiments of the invention.
Figure 10:
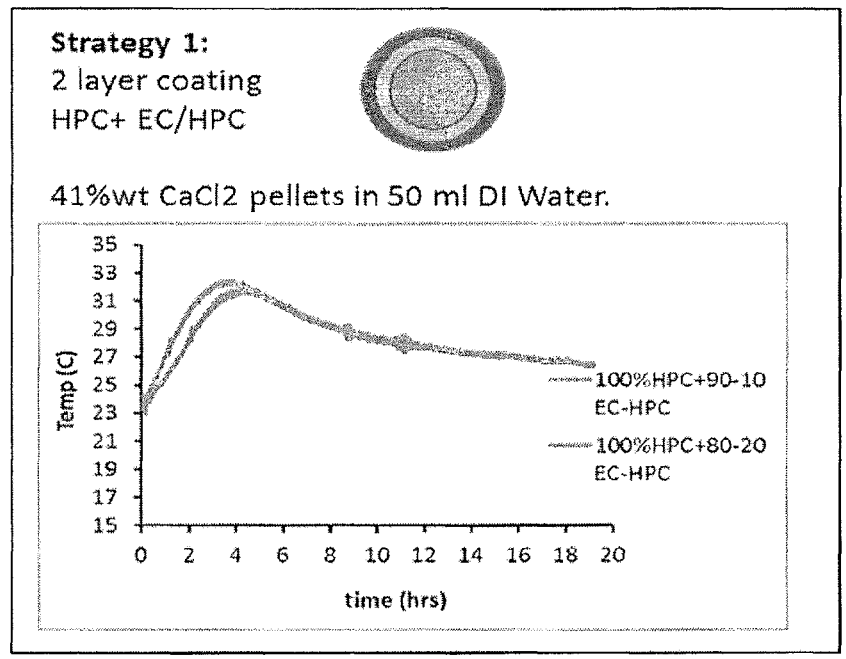
FIG. 10 includes a depiction of temperature profile for composition containing 41% wt $CaCl_2$, a coating layer of HPC, and a second coating layer of EC/HPC (either 90:10 or 80:20).
Figure 11:
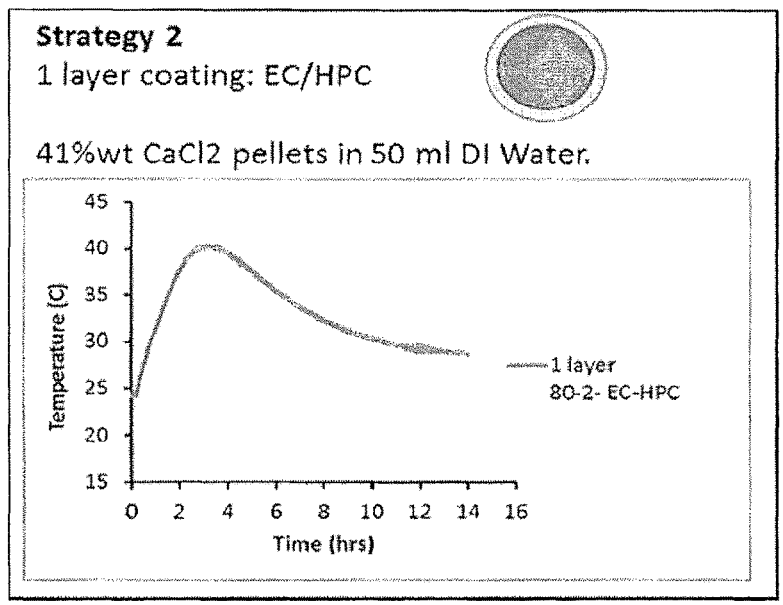
FIG. 11 includes a depiction of temperature profile for composition containing 41% wt $CaCl_2$ and a coating layer of EC/HPC (80:20).
Figure 12:
FIG. 12 includes a depiction of temperature profile for composition containing 41% wt $CaCl_2$, an inner coating layer of PVP and EXPLOTAB, and a second coating layer of EC.
Figure 12:
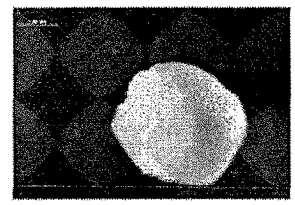
Figure 12:
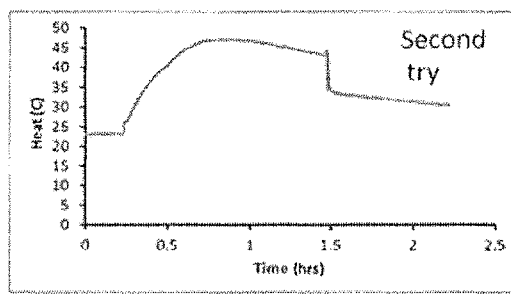
Figure 13:
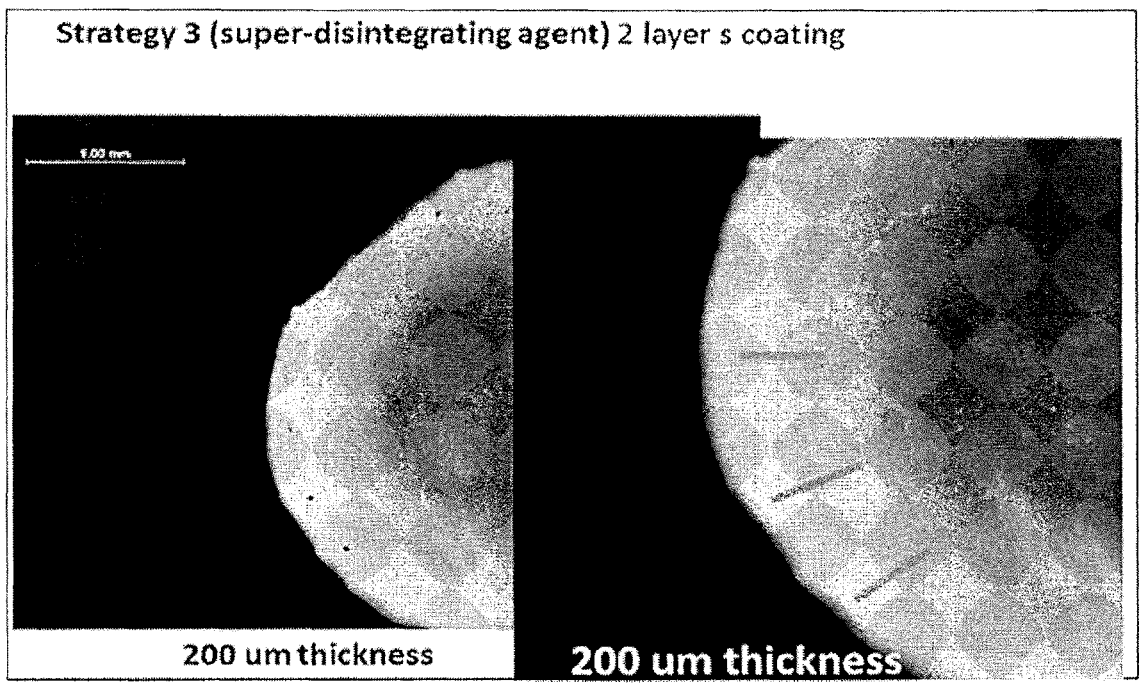
FIG. 13 includes a visual depiction of a composition containing 41% wt $CaCl_2$, a coating layer of PVP and EXPLOTAB, and a second coating layer of EC.
Figure 14:
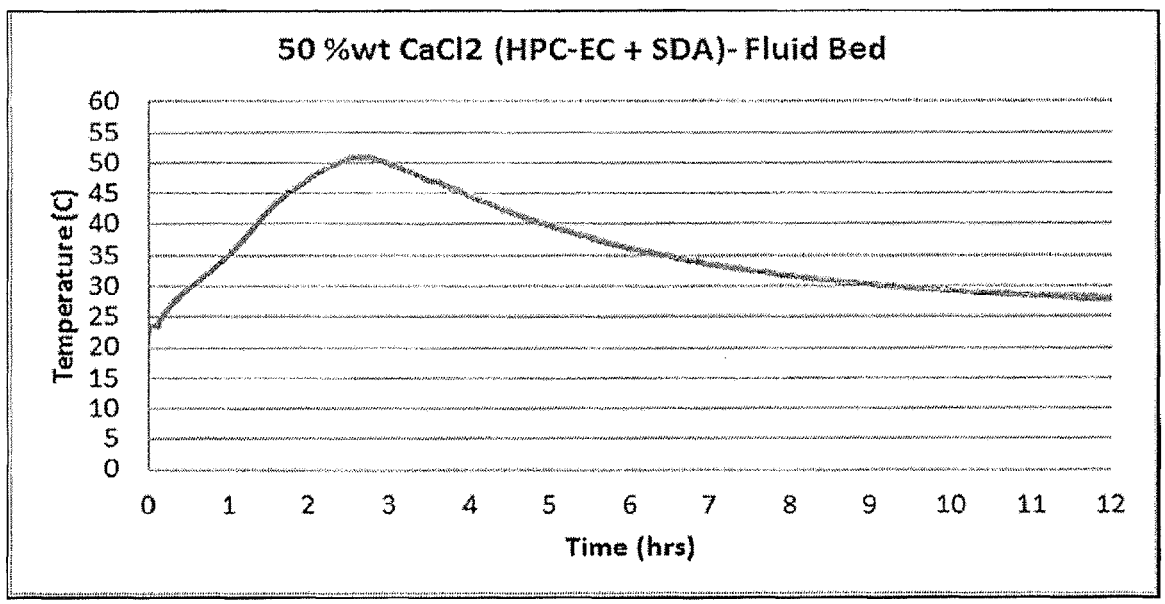
FIG. 14 includes a depiction of temperature profile using a calorimeter for composition containing 50% wt $CaCl_2$ and a coating layer of EC/HPC (ethanol as the solvent) and Super Disintegrating Agent (SDA; EXPLOTAB).
Figure 15:
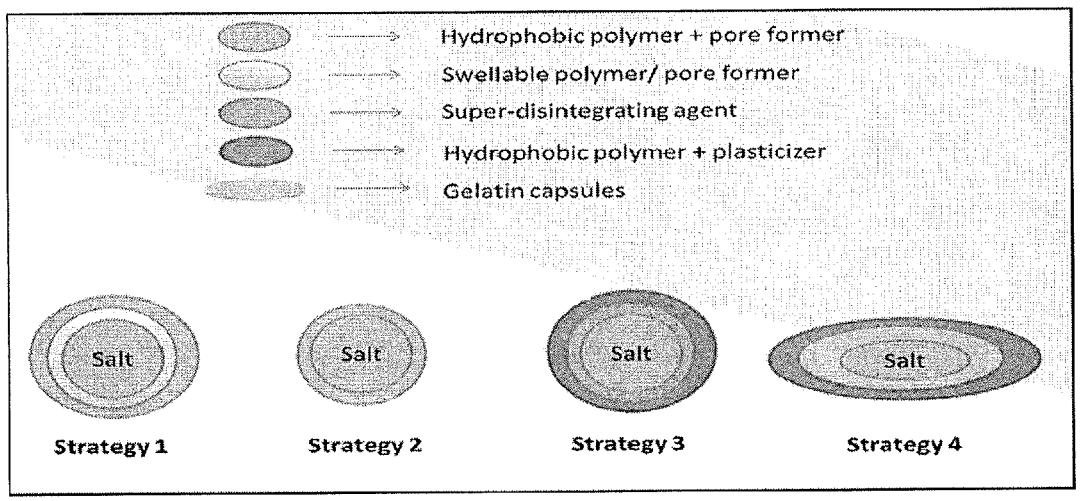
FIG. 15 includes visual depictions of several different strategies of shell embodiments of the invention for coating gelatin capsules.
Figure 16:
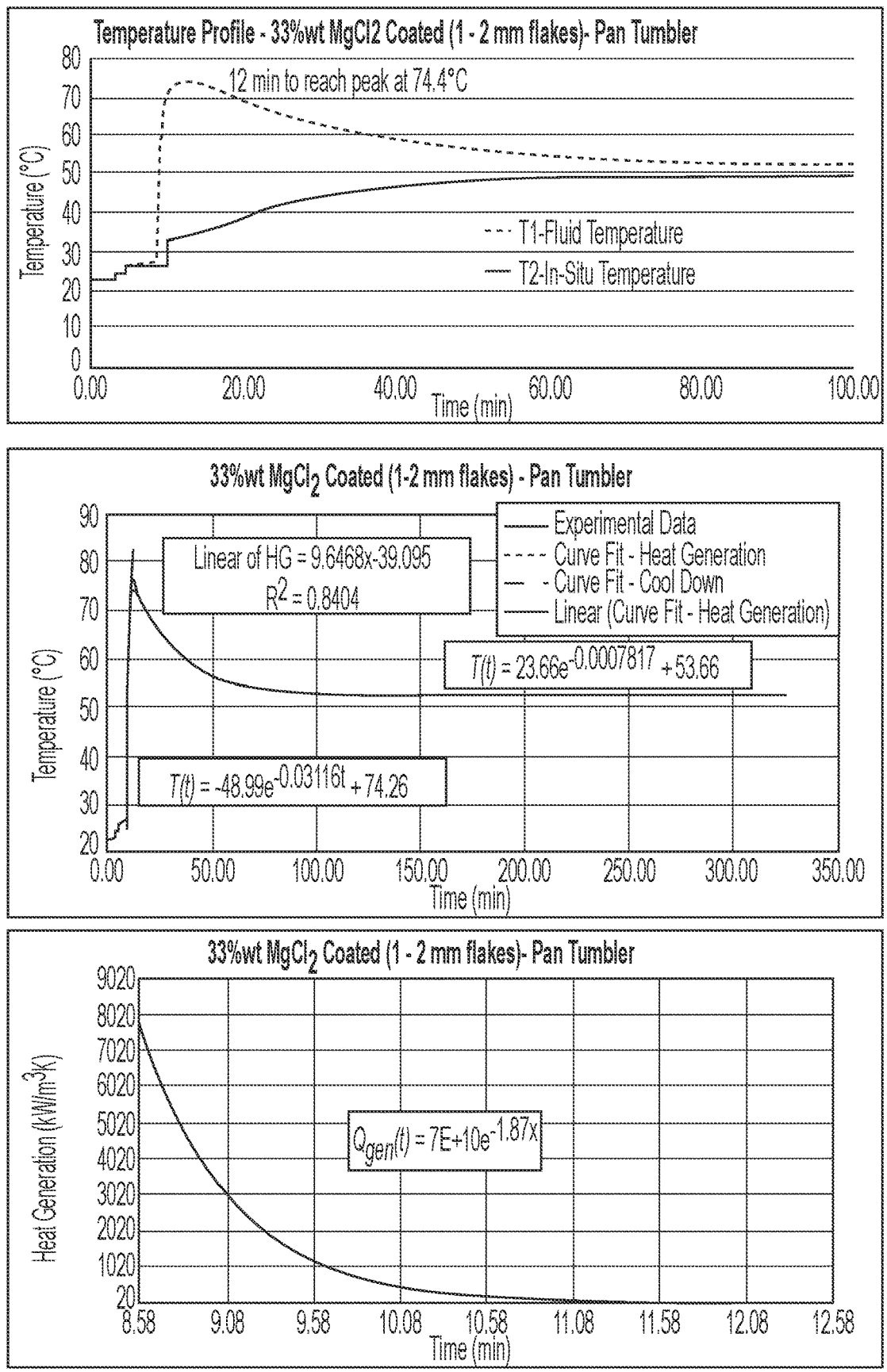
FIG. 16 includes a depiction of heat generation curves as well as a temperature profile using a calorimeter for composition of $MgCl_2$ (33% wt) (1-2 mm flakes) pan-coated with EC+TEC+SDA–Pan Tumbler coating method. The potency of the composition is 70%.
Figure 17:
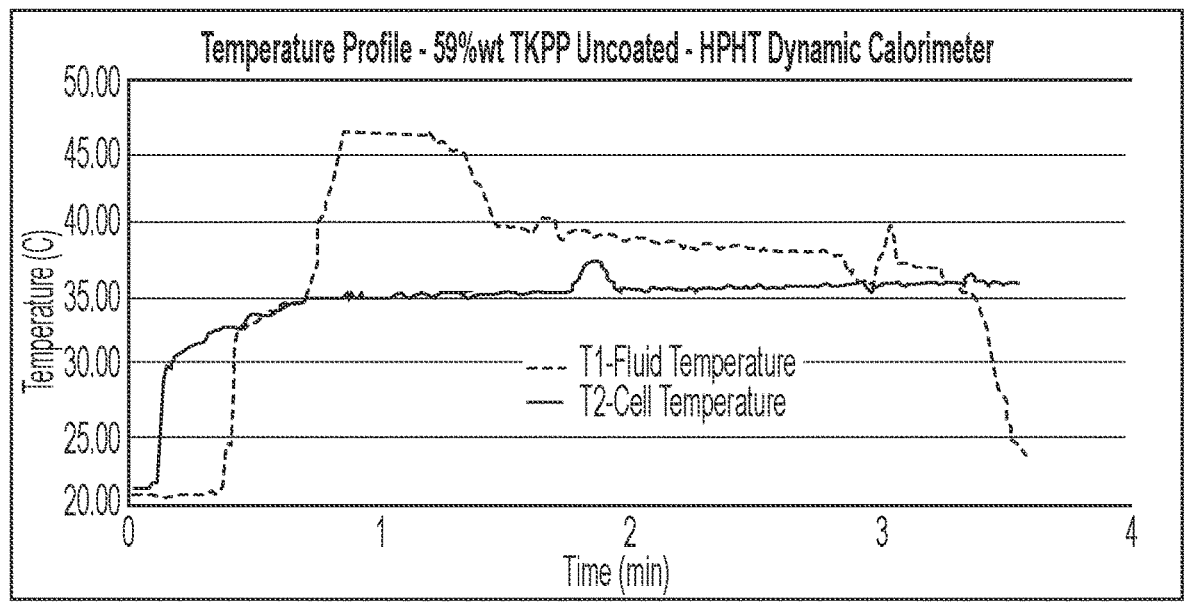
FIG. 17 includes a depiction of a temperature profile experiment in a dynamic calorimeter under 100 psi with a composition of $K_4P_2O_7$ (59% wt), uncoated.
Figure 18:
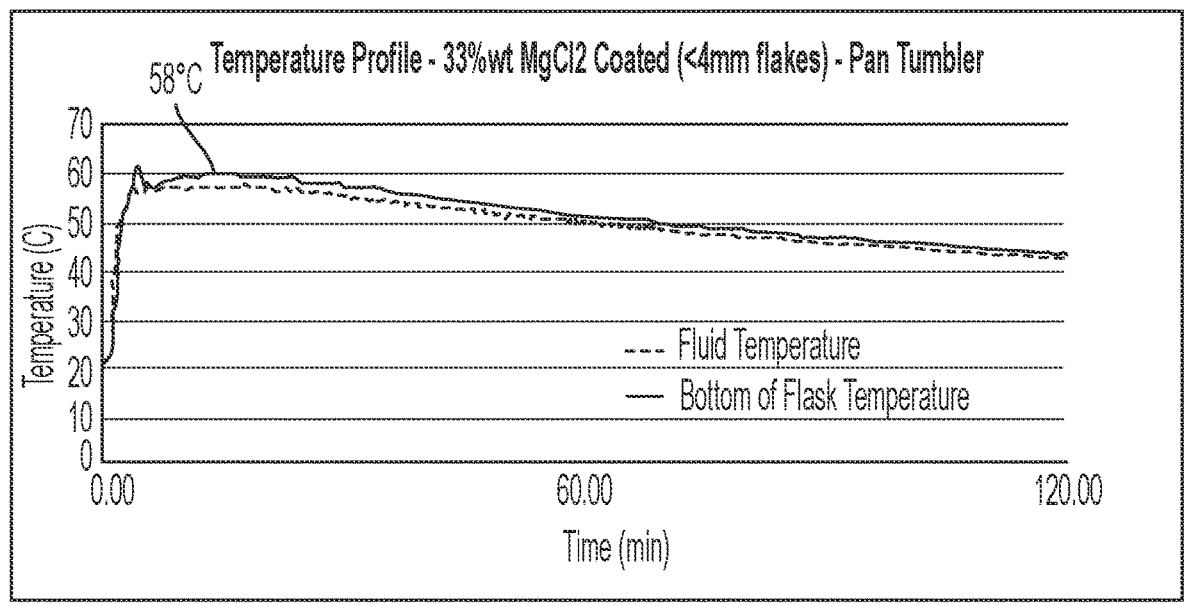
FIG. 18 includes a depiction of temperature profile using a calorimeter for composition containing 33% wt $MgCl_2$ (<4 mm flakes) with a coating layer of EC+TEC+SDA–Pan Tumbler coating method.
Figure 19:
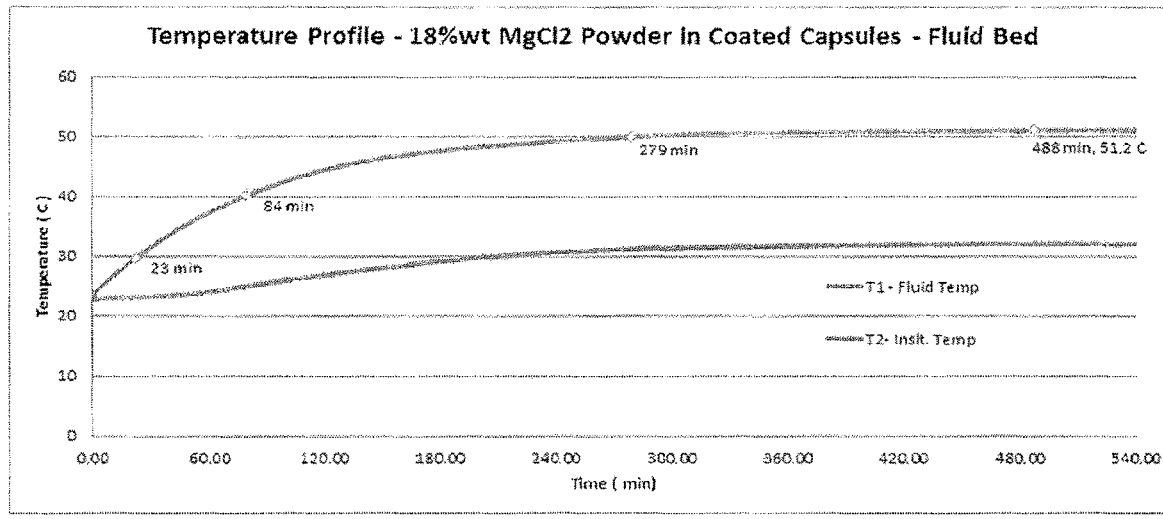
FIG. 19 includes a depiction of the temperature profile using a Genie Bottle Calorimeter for a composition containing 18% wt $MgCl_2$ powder in a capsule in aqueous solution. The capsule had a coating of EC+TEC, applied using fluid bed coating.
Figure 20:
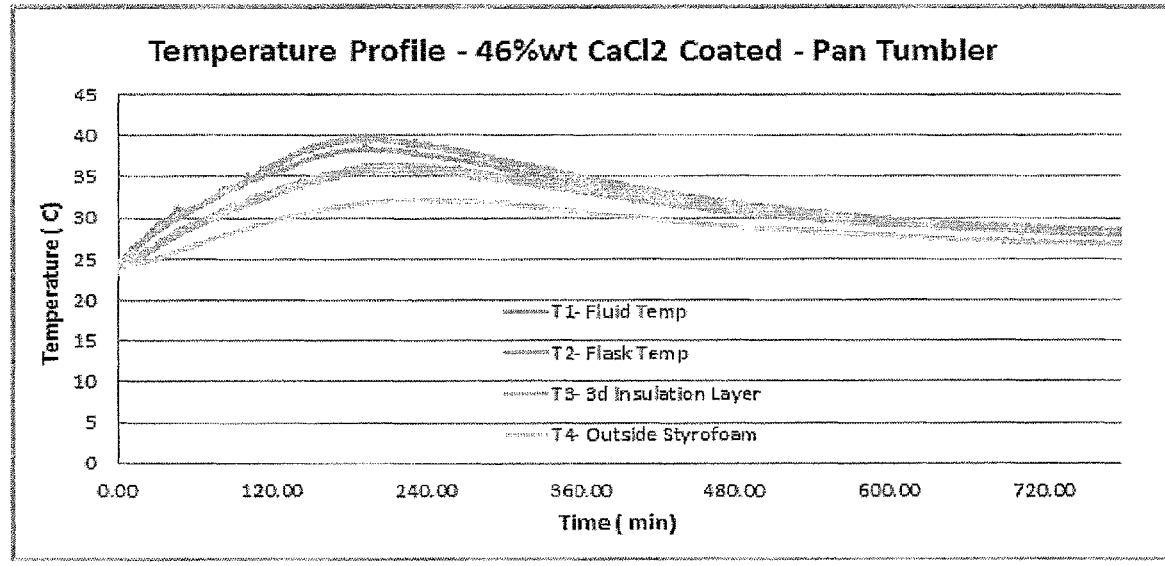
FIG. 20 includes a depiction of a temperature profile using a calorimeter for 46% wt $CaCl_2$ composition prepared by pan-coating with EC+SDA using dichloromethane as the solvent.
Figure 21:
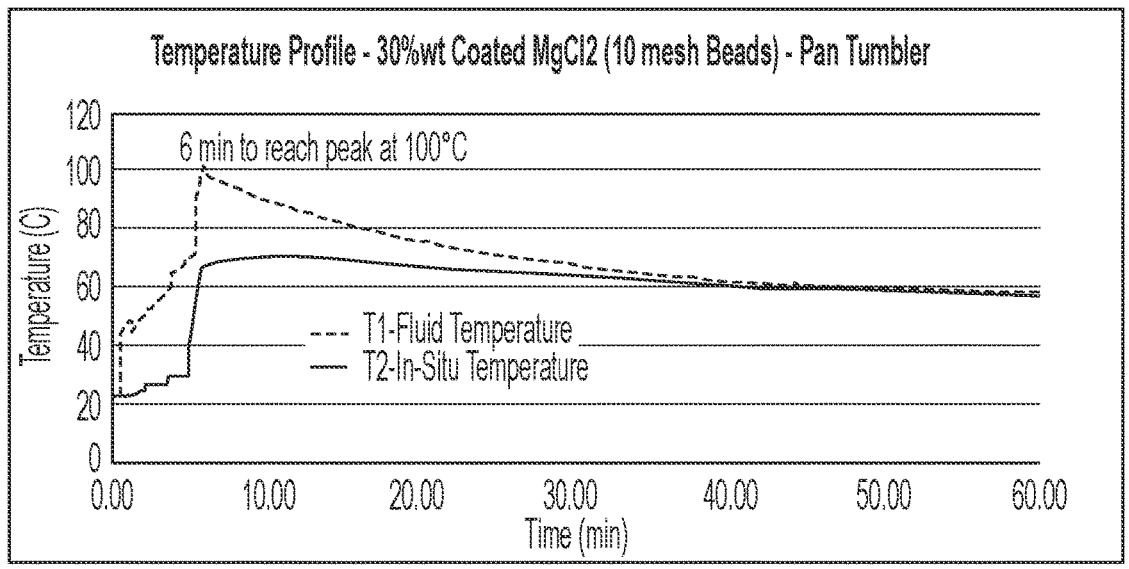
FIG. 21 includes a depiction of a temperature profile using a calorimeter for 30% wt $MgCl_2$ (<10 mesh or <2 mm heads) with a single layer of EC-TEC coating.
Figure 22:
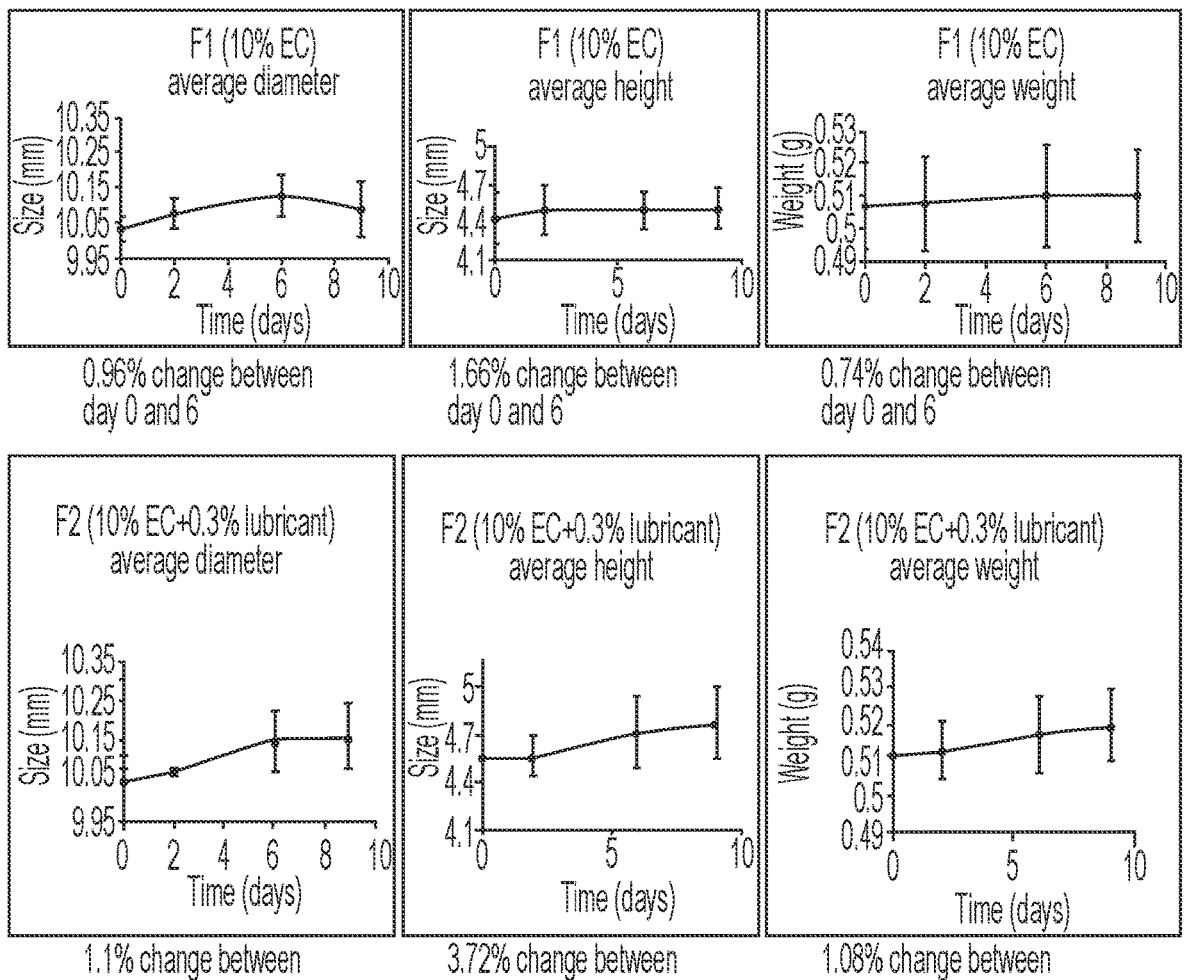
FIG. 22-28 include depictions of hardness and stability properties for compositions containing compressed flakes of $MgCl_2$.
Figure 23:
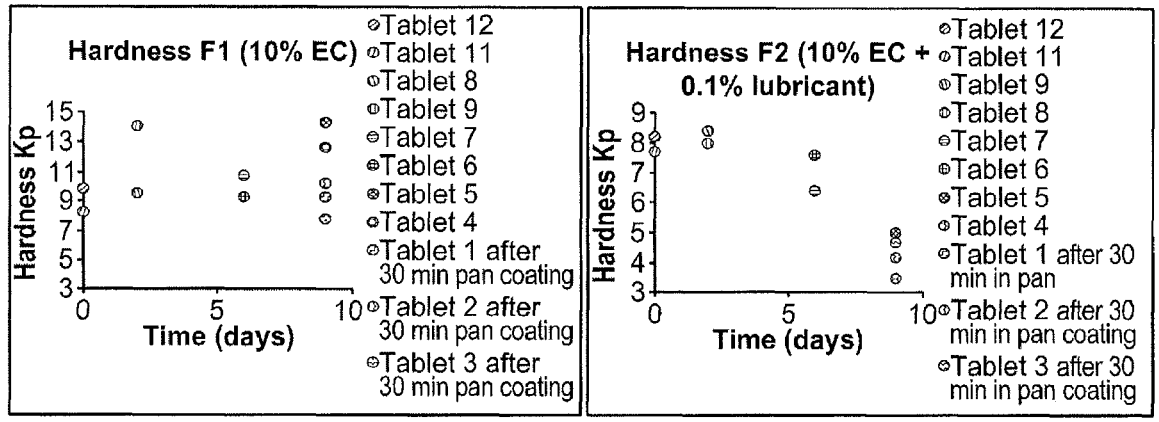
Figure 24:
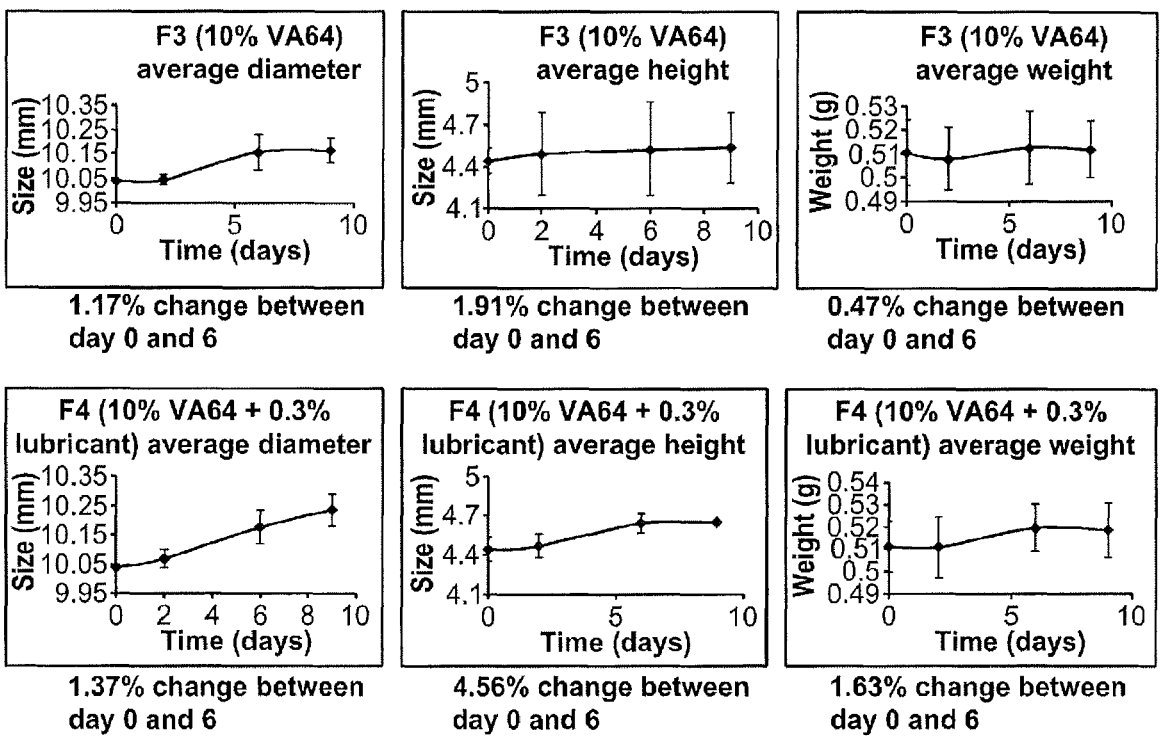
Figure 25:
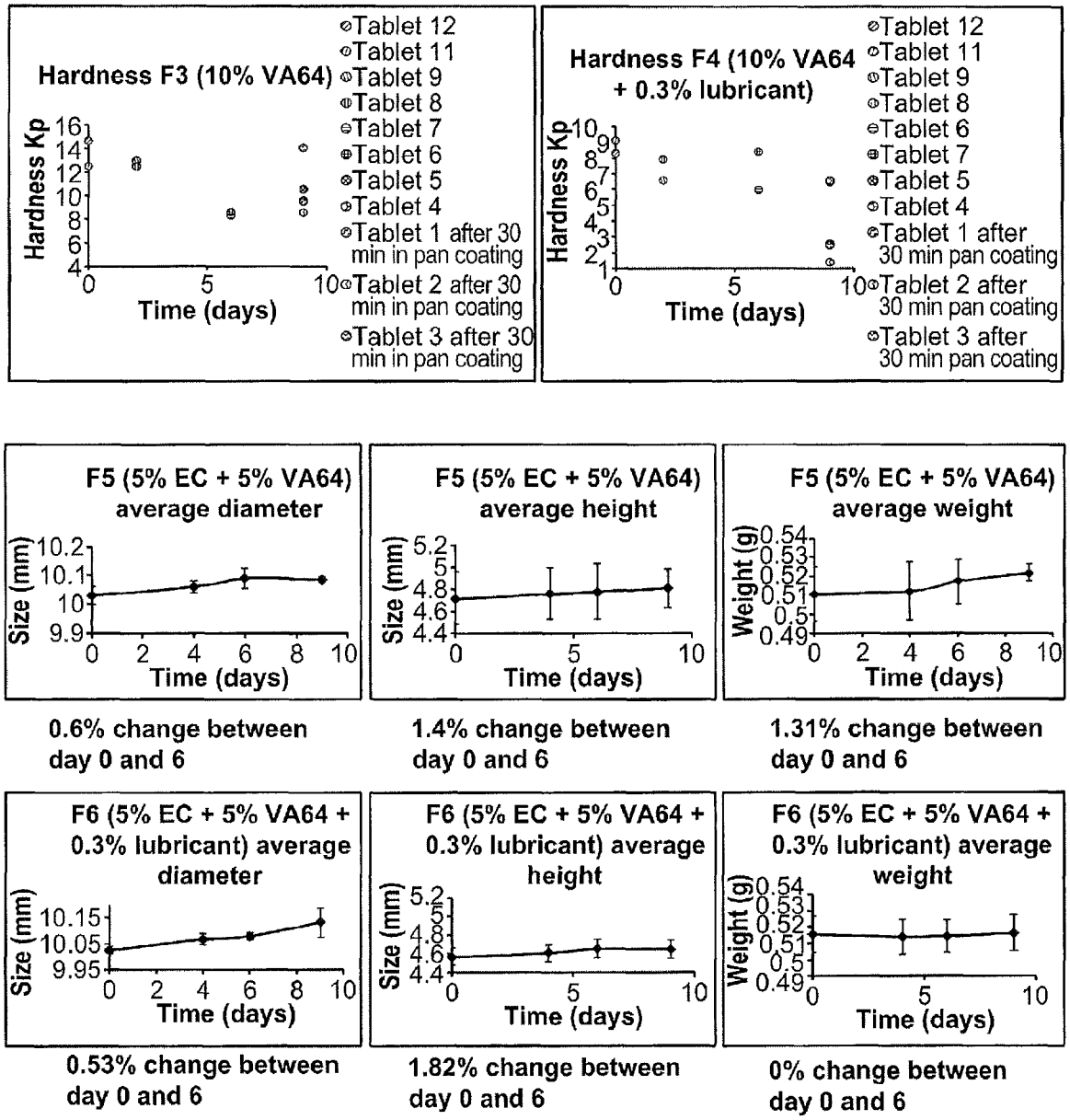
Figure 26:
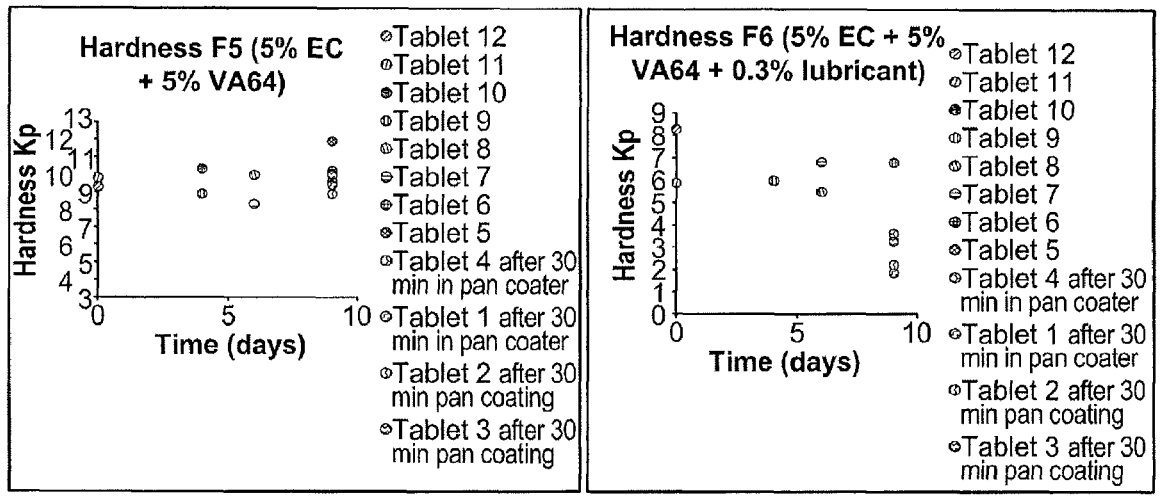
Figure 27:
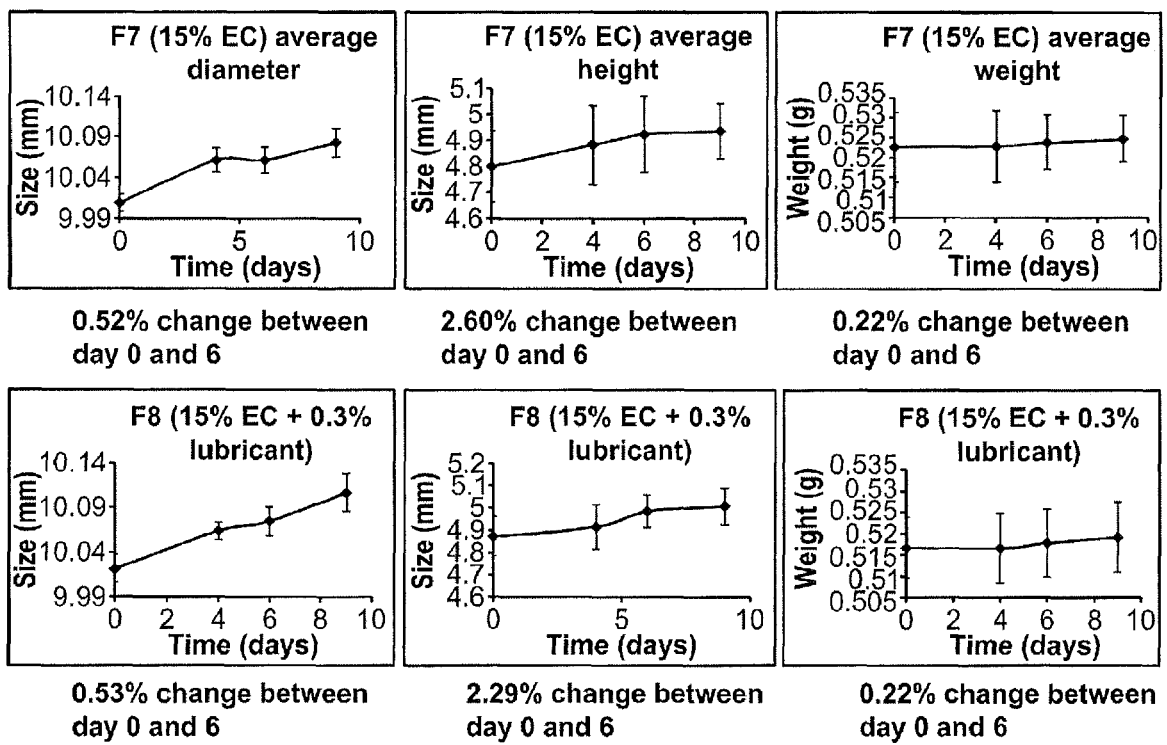
Figure 28:
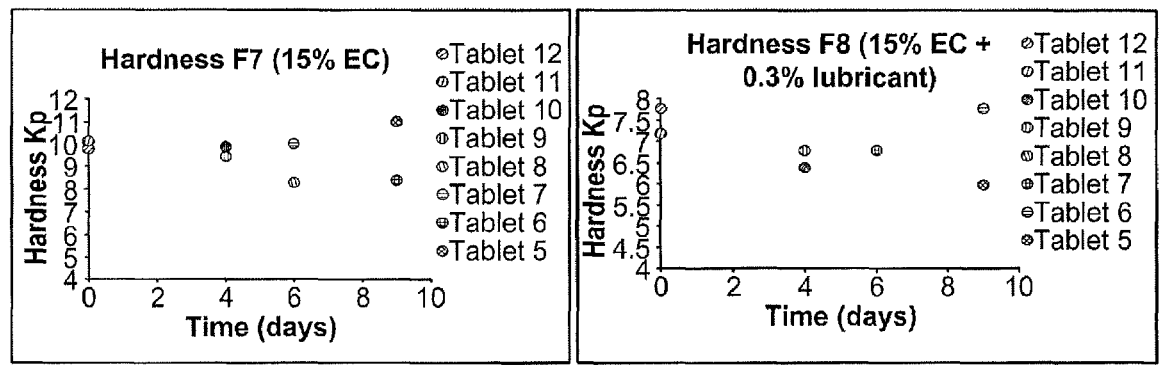
Figure 29:
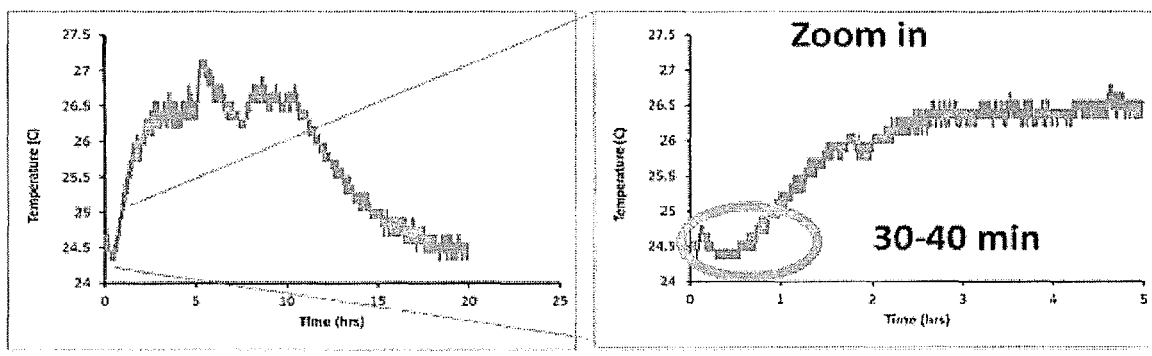
FIG. 29 includes a depiction temperature profiles of the temperature increase over time for a composition containing of 20% wt coated $MgCl_2$ powder (tabletted into 5 mm tablets) with EC coating having 3% triethyl citrate with dichloromethane as a solvent—pan tumbler coating method.
Figure 30:
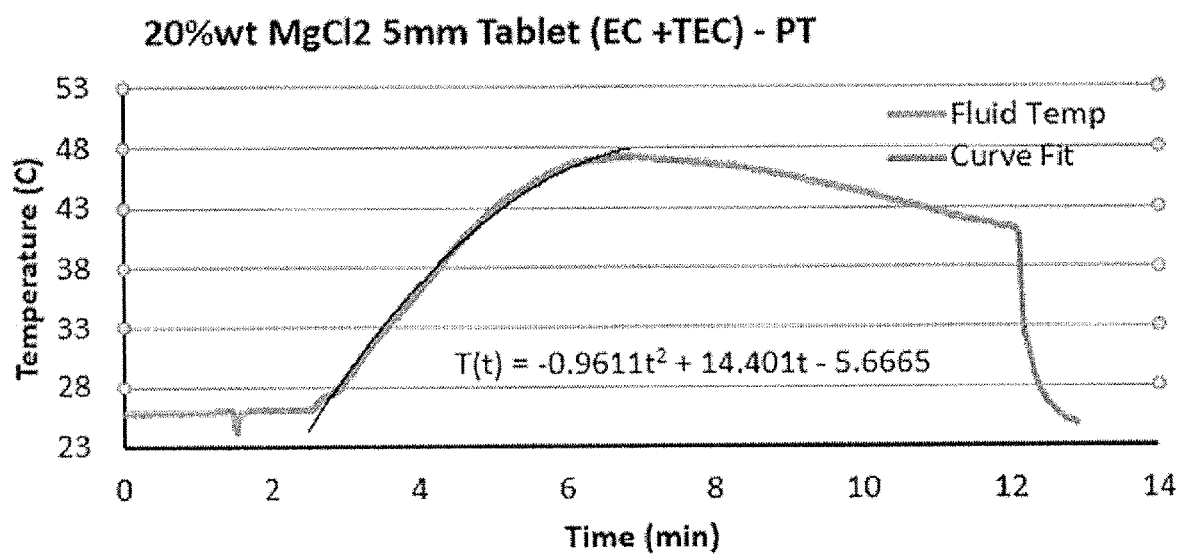
FIG. 30 includes a depiction of the temperature increase over time for a composition containing 20% wt $MgCl_2$ tablets (5 mm) with EC and triethyl citrate coating FIG. 31 includes a depiction of the temperature controlled release in aqueous solution for 27% wt $CaCl_2$ compositions having a wax coating.

Coated compositions were prepared by one of six strategies (FIG. 9):

Strategy 1—2 layers applied by using a fluid bed. The inner layer included a swellable polymer, while the external layer included a hydrophobic polymer with 10% pore former.

Strategy 2 included only 1 layer of hydrophobic polymer with 10 or 20% pore former. The coating was applied with fluid bed.

Strategy 3 included 2 layers. The inner layer included a super disintegrating agent dispersed in either a swellable polymer or a disperser polymer, and the external layer a hydrophobic polymer+ plasticizer. The coatings were applied by either fluid bead or pan coater (see table).

Strategy 4 included a salt powder in a gelatin capsule, which was then coated with the solution of hydrophobic polymer+ plasticizer in a fluid bed.

Strategy 5 included a tableted salt, which was coated with a single layer (hydrophobic polymer+ plasticizer) in a pan coated.

Strategy 6 included 1 wax layer applied in a pan coater.

In Strategy 3, MgCl$_2$ flakes were sieved into 3 different ranges of particles. Samples were coated with standard pan coating procedure with low concentration of plasticizer (see table below). Briefly, the different polymeric solutions (6%) were prepared by mixing the components with an overhead propellant. Excipients were stored in vacuum desiccators to protect them from moisture until needed. Solvents were dehydrated with molecular sieves. Coating was performed using an inert gas (N$_2$), purging the chamber 10 minutes before adding pellets, temperature was stable at 40° C., and humidity was recorded. The super disintegrating agent layer (layer 1) was applied before the external encapsulating layer (layer 2). Each application was carried out for 1-2 hours. Between layer applications the beads were cured overnight at 40° C.

Pellets weight was recorded after the deposition of each layer as well as after the overnight curing. Final weight gain and potency were calculated after the second layer deposition with respect to the weight of the original naked particles.

| Salt (coating strategy) | Super-disintegrating agent (inner layer, e.g. explotab) | Swellable polymer/ disperser polymer (e.g. HPC or PVP) | Hydrophobic polymer (external layer, e.g. EC) |
|---|---|---|---|
| CaCl$_2$ (1) | | | 90% (20% swellable polymer) - 10% solution |
| CaCl$_2$ (1) | | | 80% (10% swellable polymer) - 10% solution |
| CaCl$_2$ (1) | | 100% | 90% (10% Swellable polymer) - 10% solution |
| CaCl$_2$ (1) | | 100% | 90% (10% Swellable polymer) - 10% solution |
| CaCl$_2$ (3) | 13% | 4% | 100% polymer - 12% solution; fluidizer and pan coated, <3% TEC |
| TKPP (3) | 13% | 4% | 100% polymer - 12% solution; fluidizer, <3% TEC |
| MgCl$_2$ (flakes) (3) | 13% | 4% | 100% polymer-6 - 12% solution; pan coater, <3% TEC |
| MgCl$_2$ (powder) (4) | capsule | | 100% polymer - 12% solution, <3% TEC |
| MgCl$_2$ tablets & CaCl$_2$ (5) | | | 100% polymer-6 - 12% solution, <3% TEC |
| CaCl$_2$ (6) | | | Wax |

The following hydroscopic salt compositions were prepared and coated by various strategies. The percentage preceding the identification of the salt refers to the final concentration when the salt is combined with 100 ml of water. Potency=(mass of salt/mass of coated composition) *100:

| Sample | Salt | Potency (%) | Type | Coating Method |
|---|---|---|---|---|
| A | 18% wt MgCl$_2$ | 89 | Powder in Capsules | EC + TEC - Fluid Bed, Ethanol |
| B | 30% wt MgCl$_2$ | 93 | 10 mesh beads | EC + TEC - Pan Tumbler, Ethanol |
| C | 33% wt MgCl$_2$ | 70 | Flakes (1-2 mm) | EC + TEC + SDA - Pan Tumbler, Ethanol |
| D | 33% wt MgCl$_2$ | 64 | Flakes (<4 mm) | EC + TEC + SDA - Pan Tumbler, Ethanol |
| E | 20% wt MgCl$_2$ | 84 | Powder - 5 mm Tablet | EC + TEC - Pan Tumbler, DCM |
| F | 50% wt CaCl$_2$ | 84 | Granular | EC + HPC + SDA - Fluid Bed, Ethanol |
| G | 46% wt CaCl$_2$ | 84 | Granular | EC - Pan Tumbler, DCM |
| H | 27% wt CaCl$_2$ | n.d. | Beads/ Granular | Stearic Acid Wax - Pan Tumbler |

Example 5

Heat Generation Using Coated Compositions

Coated compositions were evaluated using a calorimeter as described in Example 1:

| Sample | $Q_{gen}$ (kW/m$^3$) | H.G. Duration (s) | Heat Release (kJ/mol) | ΔT (C.) |
|---|---|---|---|---|
| A | $26.04e^{-0.012t}$ | 30,000 | −65 | 29.0 |
| B | 1,205 | 360 | −110 | 80 |
| C | $7E+10e^{-1.87t}$ | 720 | −62 | 52 |
| D | $2329.4e^{-0.6t}$ | 480 | −46 | 41 |
| E | 443 | 270 | −44 | 22 |
| F | 1,116 | 9,390 | −27 | 29 |
| G | $293.4e^{-0.012t}$ | 12,600 | −17 | 17 |
| H | 563 | 400 | −41 | 23 |

Example 6

Figure 31:
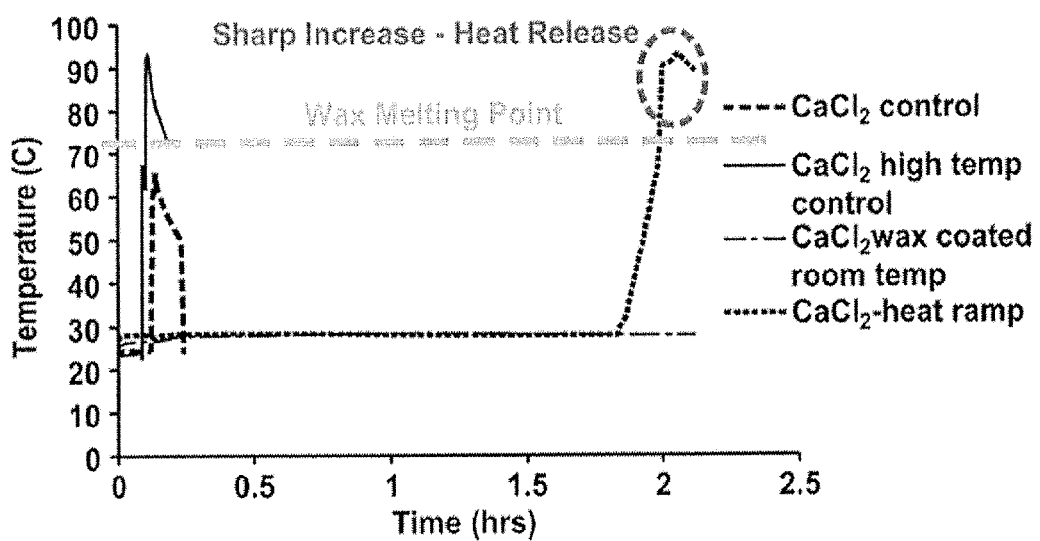
Figure 32:
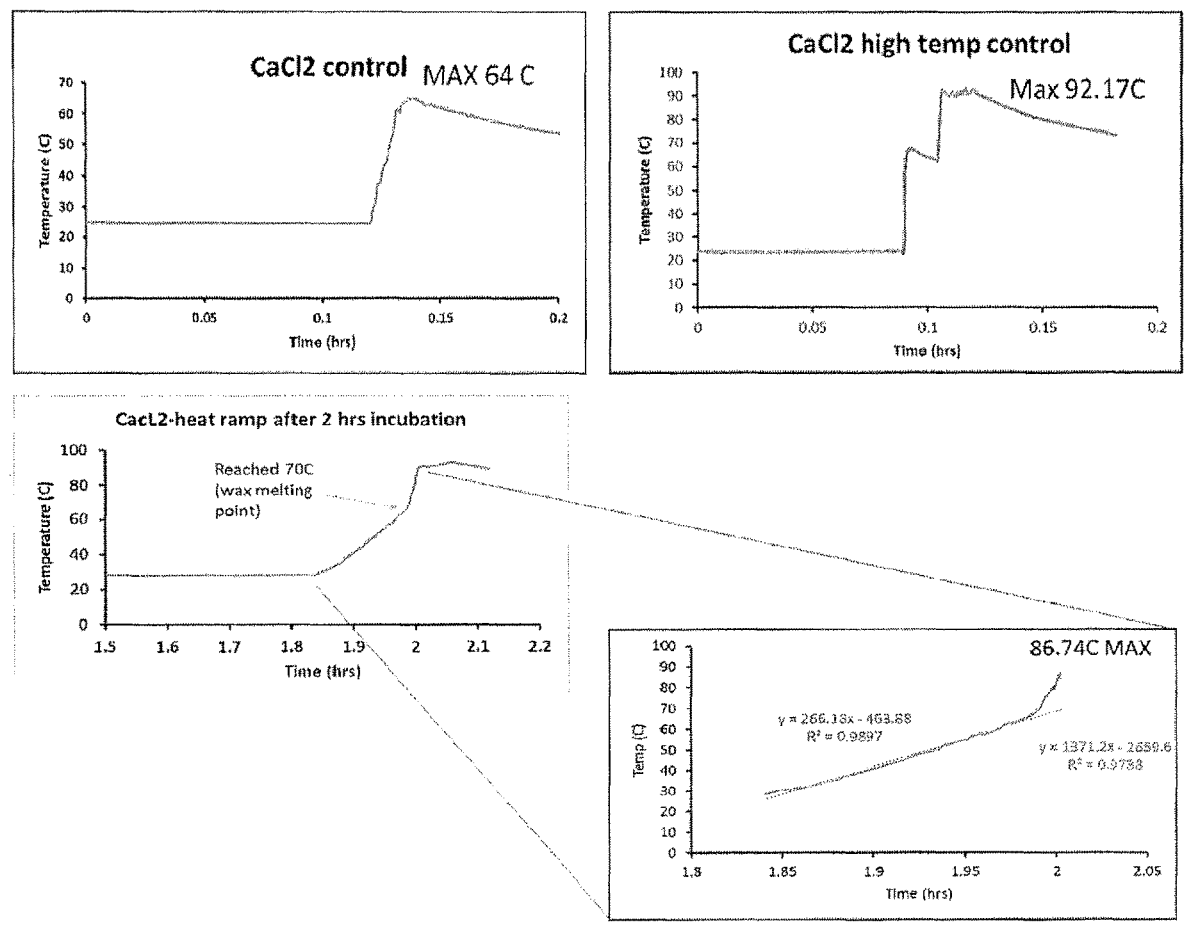
FIG. 32 includes a depiction of the temperature controlled release for $CaCl_2$ compositions having a stearic acid wax coating.
Figure 33:
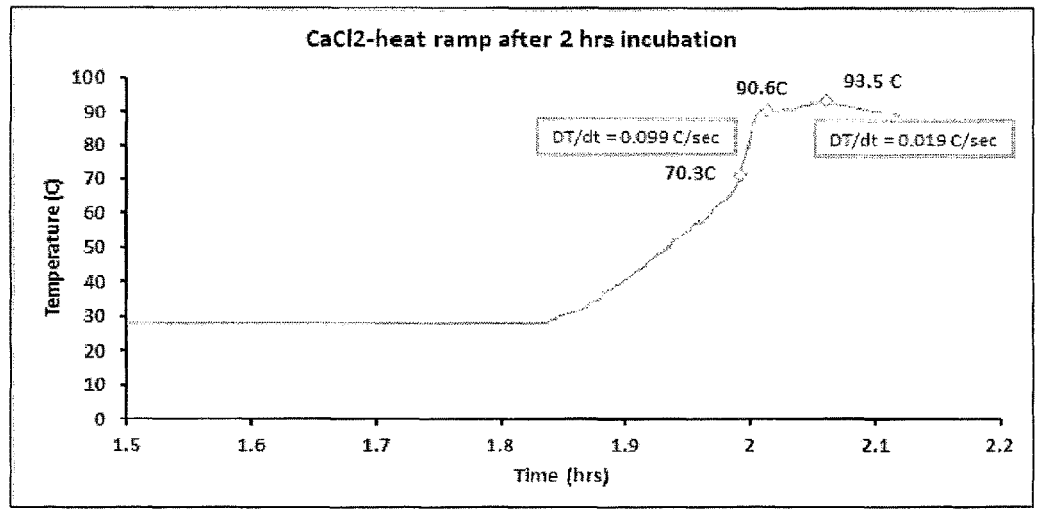
FIG. 33 includes a depiction of the temperature profile and heat generation curves over time for a composition containing 30% wt uncoated $MgCl_2$ deployed in Water Based Mud carrier fluid.
Figure 34:
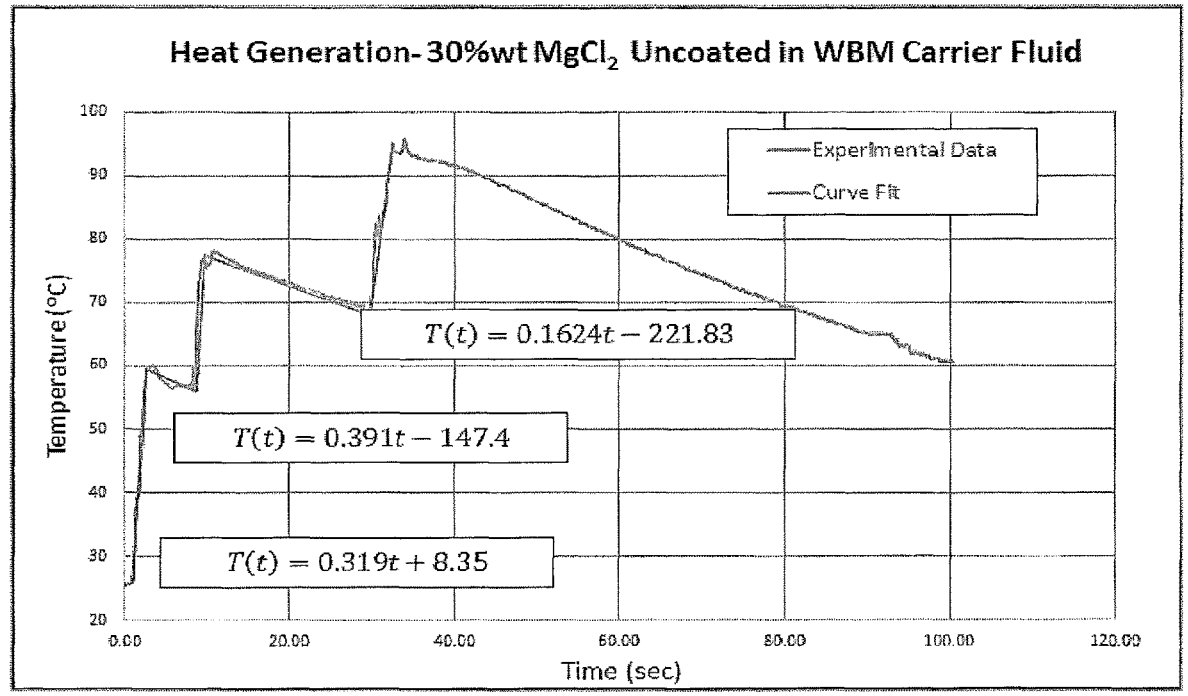
FIG. 34 includes a depiction of the temperature profile using a calorimeter for and heat generation curves over time for a composition containing 30% wt uncoated $MgCl_2$ deployed in Water Based Mud carrier fluid.
Figure 35:
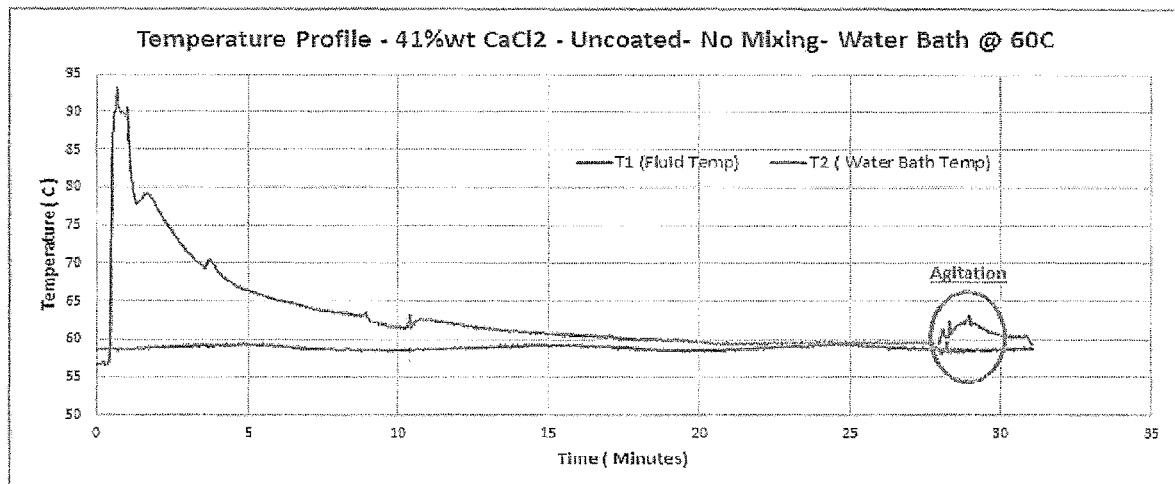
FIG. 35 depicts temperature profile using a calorimeter for 41% wt $CaCl_2$ uncoated, without mixing, in water bath with elevated temperature at 60° C.
Figure 36:
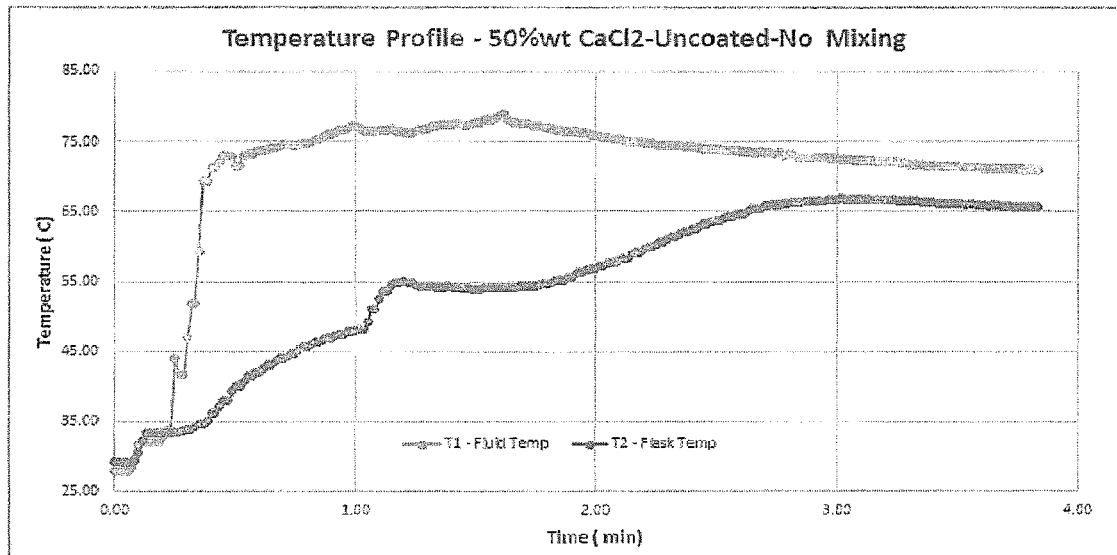
FIG. 36 depicts temperature profile using a calorimeter for 50% wt $CaCl_2$ uncoated, without mixing.

Temperature Controlled Release (Sample H) The composition was placed into water which was heated at a controlled rate. FIG. 31-32 demonstrate that the temperature was substantially increased once the fluid reached the melting point of the wax. The wax coated beads were first tested in water at room temperature to verify their ability to delay the interaction of CaCl$_2$ and water for about 2 hrs (See FIG. 31, green curve). Temperature was monitored overtime and reported as a temp vs time graph. Uncoated beads were used as a control (See FIG. 31, blue curves). The test's function was to determine whether the wax coating was able to melt and release the CaCl$_2$ upon reaching its melting point. After about 2 hours of incubation in water, the experimental temperature was raised until reaching 70-72° C. Upon reaching the melting temperature of stearic acid, a sharp increase in heat generation correlating with the release of CaCl$_2$ (See FIG. 31, purple curve, and zoom in FIG. 32) was recorded. Fitting of the data revealed a 5 fold increase in heat generation upon melting of the wax coating (see slope of the linear interpolation of the data, FIG. 32). Uncoated beads added to water either heated to 70° C. or at room temperature were used as control (See FIGS. 31 and 32B).

Example 7

Carrier Fluid Composition

Carrier fluids #13, #14 and #15 were prepared having the compositions listed below. Rheology data for the fluids were measured at room temperature and also elevated temperature.

|  | # 13 | #14 | # 15 |
|---|---|---|---|
| K$_2$CO$_3$/KHCO$_3$ | 6.0/1.0 | 6.0/1.0 | 6.0/1.0 |
| Xanthan | 1.25 |  | 1.25 |
| Diutan |  | 0.5 |  |
| Hematite | Weight up to 12 ppg (S.G. - 1.44) | 12 ppg |  |
| Barite |  |  | 12 ppg |
| MgCl$_2$ | Added 132 g - 30% wt salt as necessary for testing | 133 g - 30% wt | 132.2 g - 30% wt |

| Rheology @ 150° F. | No Heating | AHR 185° F.@ 16 hrs | +MgCl$_2$ - AHR 185° F.@ 16 hrs | AHR 250° F.@ 16 hrs | +MgCl$_2$ - AHR 250° F@ 16 hrs | AHR 250° F.; 16 hrs | +MgCl$_2$ - AHR 250° F.@ 16 hrs | No Heating | +MgCl$_2$ |
|---|---|---|---|---|---|---|---|---|---|
| 600 rpm | 36.5 | 34.7 | 58.7 | 24.9 | 73.4 | 22.7 | 18.7 | 40.7 | 95.2 |
| 300 rpm | 27.8 | 25.8 | 37.9 | 17.1 | 49.6 | 16.7 | 11.9 | 32.1 | 65.4 |
| 6 rpm | 9.6 | 6.3 | 7.8 | 5.8 | 12.2 | 3.9 | 3.4 | 9.3 | 12.3 |
| 3 rpm | 5.4 | 4.9 | 5.6 | 3.2 | 10.5 | 3.4 | 2.1 | 7.7 | 9.8 |
| PV, cP | 8.7 | 8.9 | 20.8 | 6 | 23.8 | 6 | 6.8 | 8.6 | 29.8 |
| YP, lb/100 ft2 | 19.1 | 16.9 | 17.1 | 9.3 | 25.8 | 10.7 | 5.1 | 23.5 | 35.6 |
| 10 sec Gel, lb/100 ft2 | 5.6 | 5.3 | 6 | 3.6 | 11 | 4.2 | 2.1 | 7.6 | 10.8 |
| 10 min Gel, lb/100 ft2 | 6.9 | 5.8 | 5.5 | 4.2 | 10.9 | 4.2 | 2.5 | 9.5 | 11.7 |
| Fluid Loss @ 250° F. | 25 | 25 | 32 | 32 | 48 | 44 | 50+ | 24.5 | 27 |

| Filter Cake | 4/32 | 5/32 | 7/32 | 7/32 | 7/32 | 10/32 | 10/33 | 4/32 | 5/32 |
|---|---|---|---|---|---|---|---|---|---|
| pH | 10.86 | 10.61 | 6.2 | 10.48 | 5.55 | 10.52 | 4.5 | 10.84 | 5.47 |

| Thermal Conductivity | | Specific Heat | |
|---|---|---|---|
| W/mK | BTU/hr ft° F.* | Joule/gm° C. | BTU/lb° F. |
| Fluid #13 (WBM): Carrier Fluid at 71° F. | | | |
| 0.679 | 0.392 | 3.095 | 0.755 |
| Fluid #13 (WBM): Carrier fluid + 30% wt MgCl$_2$ uncoated at 73° F. | | | |
| 0.572 | 0.333 | 2.700 | 0.646 |
| 33.3% wt MgCl$_2$ Brine at 71° F. | | | |
| 0.447 | 0.258 | 2.707 | 0.647 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method for heating fluid in a wellbore, comprising:
    a) contacting a carrier fluid with a composition, wherein the composition comprises: a plurality of encapsulated payloads, each of the encapsulated payloads consists of a payload surrounded by a shell, wherein the payload comprises:
        i) a hygroscopic salt present in an amount of 15-99% by weight of the payload; and
        ii) a binder present in an amount from 1% to 20% by weight of the payload; and
    the shell comprises a polymer layer comprising polymers selected from the group consisting of water-insoluble polymers, water-swellable polymers, and combinations thereof, wherein the shell does not include a water-soluble polymer;
    b) delivering the carrier fluid and the composition to the wellbore; and
    c) releasing the hygroscopic salt from the encapsulated payloads in the wellbore, thereby causing an exothermic event that heats the fluid in the wellbore.

2. The method of claim 1, wherein each of the encapsulated payloads has a diameter no greater than about 10 mm.

3. The method of claim 1, wherein the polymer layer comprises (i) a first polymer layer wherein polymers in the first polymer layer are selected from the group consisting of water-insoluble polymers, water-swellable polymers, and combinations thereof, and fifl a second polymer layer wherein polymers in the second polymer layer are selected from the group consisting of water-insoluble polymers, water-swellable polymers, and combinations thereof.

4. The method of claim 3, wherein the polymers in the first polymer layer are selected from the group consisting of alkylcellulose, cellulose ether, carboxyalkylcellulose, cellulose acetate, cellulose acetate phthalate, shellac, and combinations thereof.

5. The method of claim 3, wherein the polymers in the second polymer layer are selected from the group consisting of acrylic polymer, acrylic copolymer, methacrylic polymer, methacrylic copolymer, and combinations thereof.

6. The method of claim 1, wherein the exothermic event comprises a hydrolysis and neutralization cascade reaction.

7. The method of claim 6, wherein the hydrolysis and neutralization cascade reaction comprises:
    a) hydrolysis of the hygroscopic salt to give a hydrolysis product, said hygroscopic salt comprising one or more of $ZnCl_2$, $ZnBr_2$, $ZnI_2$, $Zn(SO_4)_2$, $AlCl_3$, $AlBr_3$, $Al(SO_4)_2$, $P_2O_5$, $P_4O_{10}$, or $Al_2O_3$; and
    b) neutralization of the hydrolysis product with a strong base.

8. The method of claim 1, wherein the shell comprises a layer comprising wax, said wax layer disposed between the payload and the polymer layer.

9. The method of claim 1, wherein the shell comprises a layer comprising microspheres, said microsphere layer disposed between the payload and the polymer layer.

10. The method of claim 1, wherein each of the payloads is released at a pressure of greater than 100 psi, or a pH greater than 4, or at a depth of at least 8,000 ft.

11. The method of claim 1, wherein the method reduces fluid loss or reduces lost circulation in the wellbore, reduces fractures in the wellbore, increases cement lift in the wellbore, achieves zonal isolation in the wellbore, or a combination thereof.

12. A composition comprising:
a plurality of encapsulated payloads, each of the encapsulated payloads consists of a payload surrounded by a shell, wherein the payload comprises:
  i) a hygroscopic salt in an amount of 15-99% by weight of the payload; and
  ii) a binder present in an amount from 1% to 20% by weight of the payload; and the shell comprises a layer of microspheres surrounding the payload, and a polymer layer surrounding the layer of microspheres
wherein the polymer layer comprises polymers selected from the group consisting of water-insoluble polymers, water-swellable polymers, and combinations thereof;
wherein the shell does not include a water-soluble polymer; and
wherein the shell is configured to controllably release the hygroscopic salt from at least one of the plurality of encapsulated payloads at predetermined conditions, and thereby to cause an exothermic event, in a wellbore.

13. The composition of claim 12, wherein the hygroscopic salt is selected from the group consisting of $ZnCl_2$, $ZnBr_2$, $ZnI_2$, $Zn(SO_4)_2$, $AlCl_3$, $AlBr_3$, $Al(SO_4)_2$, $P_2O_5$, $P_4O_{10}$, $Al_2O_3$ and combinations thereof.

14. The composition of claim 13, wherein the payload further comprises an alkaline hydroxide, an alkaline earth hydroxide, or a combination thereof.

15. The composition of claim 12, wherein the hygroscopic salt comprises a calcium salt, a magnesium salt, a potassium salt, an aluminum salt, or a mixture thereof.

16. The composition of claim 12, wherein the polymer layer comprises (i) a first polymer layer wherein polymers in the first polymer layer are selected from the group consisting of water-insoluble polymers, water-swellable polymers, and combinations thereof, and (ii) a second polymer layer wherein polymers in the second polymer layer are selected from the group consisting of water-insoluble polymers, water-swellable polymers, and combinations thereof.

17. The composition of claim 16, wherein the polymers in the first polymer layer are selected from the group consisting of alkylcellulose, cellulose ether, carboxyalkylcellulose, cellulose acetate, cellulose acetate phthalate, shellac, and combinations thereof.

18. The composition of claim 16, wherein the polymers in the second polymer layer are selected from the group consisting of acrylic polymer, acrylic copolymer, methacrylic polymer, methacrylic copolymer, and combination thereof.

19. A fluid composition comprising:
a) a carrier fluid; and
b) the composition of claim 12.

20. A composition comprising:
a plurality of encapsulated payloads, each of the encapsulated payloads consists of a payload surrounded by a shell, wherein the payload comprises:
a hygroscopic salt present in an amount of 15-99% by weight of the payload; and
a binder present in an amount from 1% to 50% by weight of the payload
the shell comprises a polymer layer, wherein the polymer layer comprises polymers selected from the group consisting of water-insoluble polymers, water-swellable polymers, and combinations thereof; and
wherein the shell does not include a water-soluble polymer;
wherein two or more of the encapsulated payloads are agglomerated within a polymer matrix; and
wherein the shell is configured to controllably release the hygroscopic salt from at least one of the plurality of encapsulated payloads at predetermined conditions, and thereby to cause an exothermic event in a wellbore.

* * * * *

UNITED STATES PATENT AND TRADEMARK OFFICE
CERTIFICATE OF CORRECTION

| | | |
|---|---|---|
| PATENT NO. | : 11,767,737 B2 | Page 1 of 1 |
| APPLICATION NO. | : 17/005583 | |
| DATED | : September 26, 2023 | |
| INVENTOR(S) | : Eric Van Oort et al. | |

It is certified that error appears in the above-identified patent and that said Letters Patent is hereby corrected as shown below:

In the Claims

In Column 20, Line 30, of Claim 3, delete "fifl" and insert -- (ii) --

Signed and Sealed this
Seventh Day of November, 2023

*Katherine Kelly Vidal*

Katherine Kelly Vidal
*Director of the United States Patent and Trademark Office*